United States Patent [19]

Kameyama et al.

[11] Patent Number: 5,239,592
[45] Date of Patent: Aug. 24, 1993

[54] CHARACTER RECOGNIZING SYSTEM

[75] Inventors: Hirofumi Kameyama; Shoji Miki; Hiroki Tsubota, all of Himeji, Japan

[73] Assignee: Glory Kogyo Kabushiki Kaisha, Hyogo, Japan

[21] Appl. No.: 665,230

[22] Filed: Mar. 6, 1991

[30] Foreign Application Priority Data

| Mar. 30, 1990 [JP] | Japan | 2-84391 |
| Apr. 9, 1990 [JP] | Japan | 2-93720 |
| Sep. 26, 1990 [JP] | Japan | 2-258317 |

[51] Int. Cl.$^5$ ............................................. G06K 9/00
[52] U.S. Cl. ........................................ 382/13; 382/7; 382/9; 382/18
[58] Field of Search .................. 382/9, 13, 48, 7, 18; 225/435

[56] References Cited

U.S. PATENT DOCUMENTS

| 4,481,665 | 11/1984 | Ota | 382/9 |
| 4,677,585 | 6/1987 | Ikegami et al. | 382/61 |
| 4,680,803 | 7/1987 | Dilella | 382/9 |
| 4,850,025 | 7/1989 | Abe | 382/9 |
| 4,903,311 | 2/1990 | Nakamura | 382/48 |
| 4,933,977 | 6/1990 | Ohnishi et al. | 382/9 |
| 5,040,226 | 8/1991 | Elischer et al. | 382/61 |

FOREIGN PATENT DOCUMENTS

| 0054842A2 | 12/1981 | European Pat. Off. |
| WO87/07057 | 5/1987 | PCT Int'l Appl. |
| 1271705 | 10/1969 | United Kingdom |
| 2218839A | 5/1989 | United Kingdom |

Primary Examiner—Joseph Mancuso
Attorney, Agent, or Firm—Wenderoth, Lind & Ponack

[57] ABSTRACT

A plurality of recognition candidates are obtained through continuing a segmentation to a numeral recognition realized by segments, and an optimum one is selected from among the candidates by means of connection information, thereby preventing continuous numerals from being recognized erroneously. A method of correctly recognizing the handwritten characters, especially numerals written in checks includes the steps of: performing a line drawing analysis is of the character set to be recognized in order to extract a characteristic of the arrangement of blocks, proposing a hypothesis about the monetary unit type, and finally verifying the above hypothesis to display the result of the character recognition. Further, this method can surely distinguish handwritten characters from a bar which is either printed for entry of characters or handwritten, and eliminate the bar from the object of character recognition to extract the characters alone. In detecting the bar, six formulas for under-bar, middle-bar, upper-bar, inclined bar, inclined under-bar and inclined upper-bar relative to the characters are used to determine certainty factor of a bar, and the bar having the highest linearity is extracted.

10 Claims, 26 Drawing Sheets $ 32^{64}/_{00}

$ 32^{64}/_{00}

FIG. 4A TYPE A 
FIG. 4B TYPE B 
FIG. 4C TYPE C 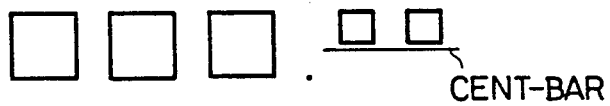
FIG. 4D TYPE D 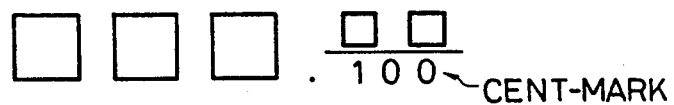
FIG. 4E TYPE E 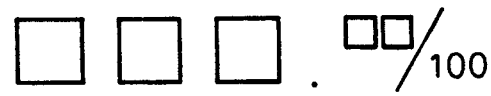
FIG. 4F TYPE F 
FIG. 4G TYPE G 

0961 ~101

────────────
       100

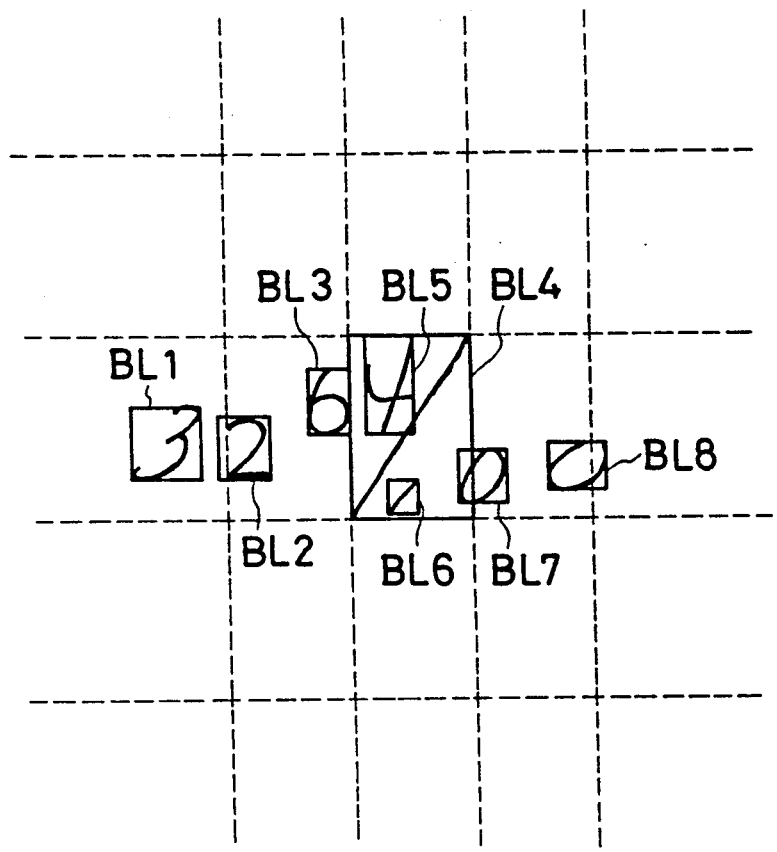
F I G. 12
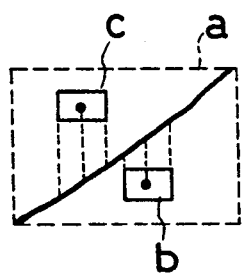
F I G. 14
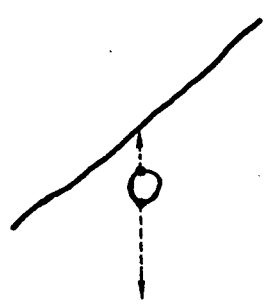
F I G. 15

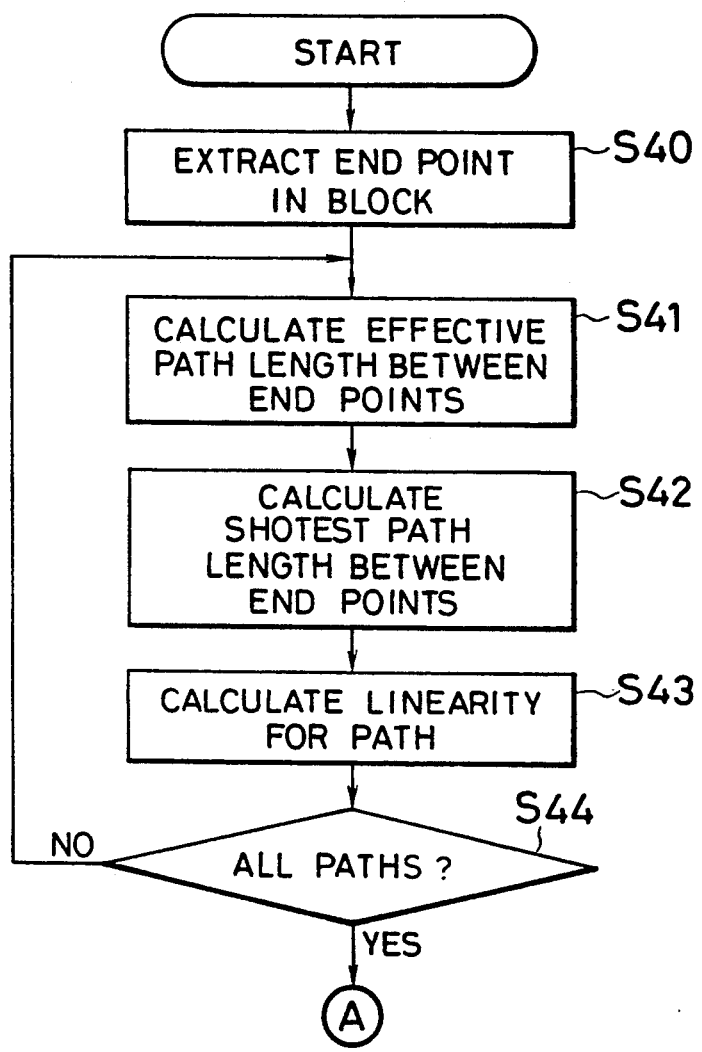
F I G. 16A

| HORIZON | Out L | Left | Center | Right | Out R |
|---|---|---|---|---|---|
| VERTICAL | Out Up | Upper | Middle | Under | Out ud |
| CODE | ARRANGEMENT | | | | |
| 1 | s m 1 | | | | |
| 2 | s m | 1 | | | |
| 3 | s m | | 1 | | |
| 4 | s m | | | 1 | |
| 5 | s m | | | | 1 |
| 6 | s | m 1 | | | |
| 7 | s | m | 1 | | |
| 8 | s | m | | 1 | |
| 9 | s | m | | | 1 |
| 10 | s | | m 1 | | |
| 11 | s | | m | 1 | |
| 12 | s | | m | | 1 |
| 13 | s | | | m 1 | |
| 14 | s | | | m | 1 |
| 15 | s | | | | m 1 |
| 16 | | s m 1 | | | |
| 17 | | s m | 1 | | |
| 18 | | s m | | 1 | |
| 19 | | s m | | | 1 |
| 20 | | s | m 1 | | |
| 21 | | s | m | 1 | |
| 22 | | s | m | | 1 |
| 23 | | s | | m 1 | |
| 24 | | s | | m | 1 |
| 25 | | s | | | m 1 |
| 26 | | | s m 1 | | |
| 27 | | | s m | 1 | |
| 28 | | | s m | | 1 |
| 29 | | | s | m 1 | |
| 30 | | | s | m | 1 |
| 31 | | | s | | m 1 |
| 32 | | | | s m 1 | |
| 33 | | | | s m | |
| 34 | | | | s | m 1 |
| 35 | | | | | s m 1 |

F I G. 13

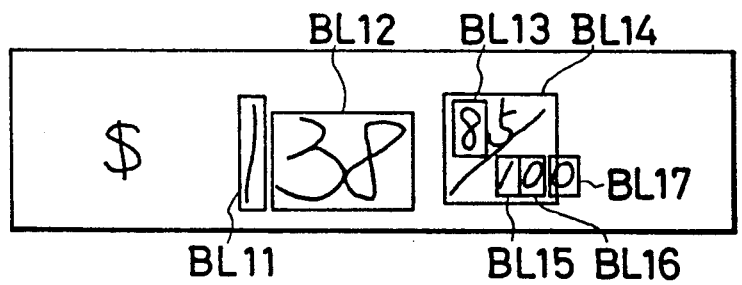
FIG. 17
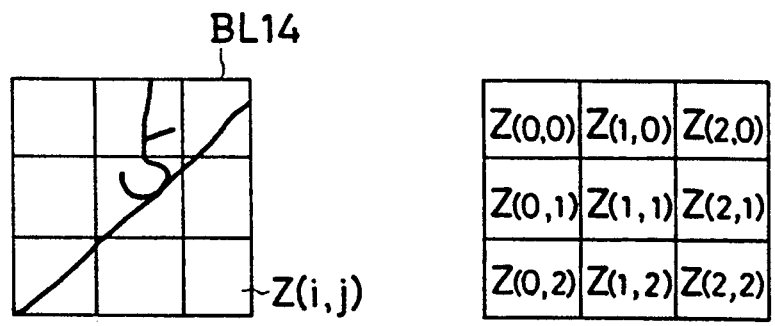
FIG. 18
FIG. 19     FIG. 20

(A)  (B)  (C)

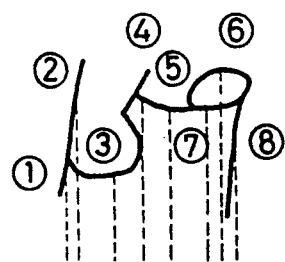
FIG. 30
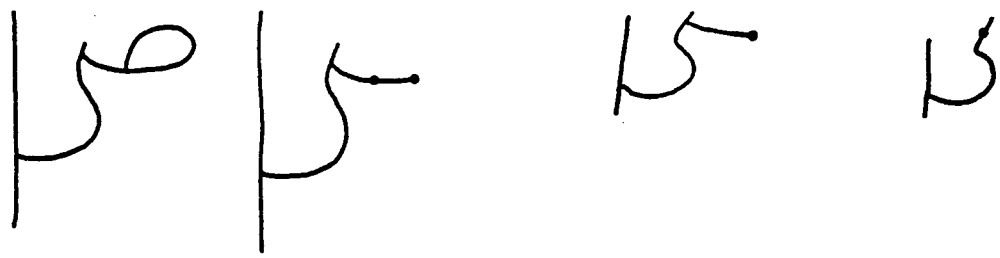
(A)  (B)  (C)  (D)
(E)  (F)  (G)
FIG. 32

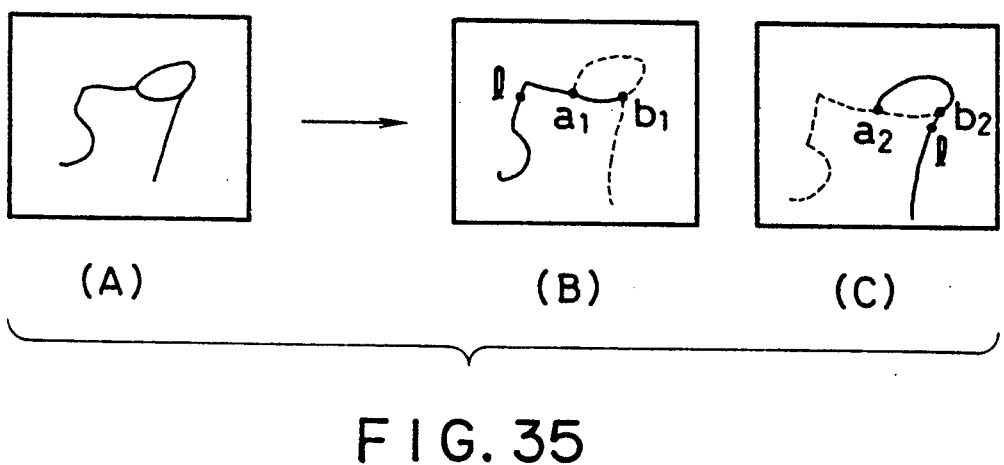
FIG. 35
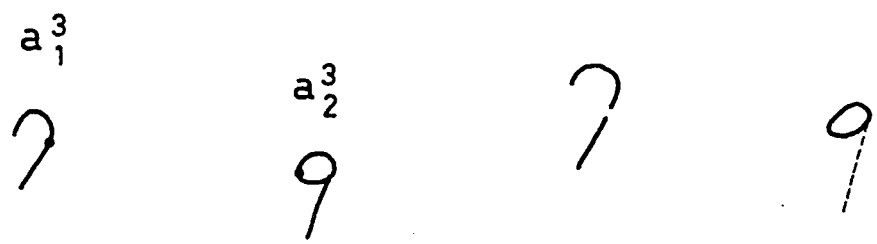
FIG. 36A
FIG. 36B
FIG. 36C
FIG. 36D

| SEGMENT CANDIDATES | NUMERAL RECOGNITION RESULT | BRANCH STRING |
|---|---|---|
| $a_1^1$ | "NO" | {1, 2, 3, 4, 5, 7, 6, 8} |
| $b_1^1 - c_1^1$ | "1" – "NO" | {1,2} – {3,4,5,7,6,8} |
| $b_1^2 - c_1^2$ | "1" – "5" – "7" | {1,2} – {3,4,5,7} – {6,8} |
| $b_2^2 - c_2^2$ | "1" – "5" – "9" | {1,2} – {3,4,5} – {7,6,8} |

FIG. 38

CHARACTER RECOGNIZING SYSTEM

BACKGROUND OF THE INVENTION

1. Field of the Invention

This invention relates to a character recognizing system which recognizes characters by making use of character arrangement types in order to effectively and reliably recognize handwritten characters (numerals) which include attached symbols such as a bar and continuous numerals contacting each other.

2. Description of the Prior Art

As a conventional method of the character recognition, there exists, for example, the method of character recognition disclosed in Japanese Laid-Open Patent No. 233585/1989, which is proposed by the present applicant. This has provided a character recognizing method as follows. At first, data of characters are subjected to a pre-processing for smoothing and thinning and line drawing structure analysis, and the processed data are further subjected to a whole-view structural recognition in order to discriminate and extract a plurality of recognition candidate blocks each having a character, and then character recognition is carried out for each of the blocks. For the blocks in which the data could not be recognized as a character, the segmentation, the line drawing structure analysis or restructuring of the data will be effected until the recognition of the data is completed.

In the conventional method of the character recognition of handwritten characters as stated above, however, it has been impossible to finally recognize or deal with such a case, for example, of a U.S. check as shown in FIG. 1. FIG. 1 shows only a write-in portion in the check. As the handwritten characters shown embodically in FIG. 1 are progressively recognized, the characters will finally become divided into the blocks BL1 to BL8 as shown in FIG. 3. Subsequently, if each block is subjected to the character recognition, blocks BL1, BL2, BL3, BL5, BL7 and BL8 can be character-recognized but the blocks BL4 and BL6 can not be recognized as they should be and are mistakenly recognized. More specifically, the block BL4 is defectively recognized as a numeral "1" and the block BL6 is also recognized as numeral "1".

In addition, even if informations for recognizing symbols such as the cent-bar, the cent-point and the like are added to the aforementioned conventional method, it is impossible to discriminate between a numeral "1" and the cent-bar for the case of the block BL4. In the same circumstance, it is impossible to discriminate between a "1" of the numeral and the cent-bar for the case of the block BL6. As a result, in spite of the proper extraction of the blocks, if the character of a selected block has two or more kinds of possibilities, the problem has occurred that the character recognition could not be carried out.

In the case of the U.S. check as shown in FIG. 1, the format in which the handwritten characters are filled consists of the dollar-order, the cent-order, the cent-bar and the cent-mark, etc., in addition, can mostly be classified into several kinds of types, although depending upon individual variations. The fact is that the kinds of handwritten characters on the U.S. check generally belong to one of the types A to F as shown in FIGS. 4A to 4G. Further, it should be noted that this feature is not only applied to the U.S. check, but also the cases in which formats would be limited within definitive kinds.

There has conventionally been known a method shown in FIGS. 5A and 5B as the method for detecting a bar included in character information for recognizing the character information. As shown in FIG. 5A, there is written in advance a bar 100 in horizontal and linear arrangement as a reference line and characters 101 are to be written above the line. In recognizing the characters 101 written above the bar 100, the total number of dots in the horizontal direction of the characters is first counted in the vertical direction, a histogram of the number of dots in the vertical direction is prepared as shown in FIG. 5B, and then the part with extremely large number of dots is recognized as the bar 100 of the reference line. Referring to the line, the characters 101 thereabove are discriminated.

Further, one block in which a bar is in contact with a numeral generally occurs as shown in FIG. 17 showing a write-in portion of the U.S. check. It is necessary to extract the numerals by detecting the bar from the blocks in which the numeral and the bar are in contact in order to recognize the numeral information. According to the separating method described above, since a linear bar as the reference line is horizontally written in advance, it is necessarily possible to detect the numeral by forming the histogram of the horizontal dot number. However, a handwritten bar is not always horizontal and moreover the length of the bar varies in accordance with the size of the character and the bar from the histogram.

Even if the method disclosed in Japanese Laid-Open Patent No. 233585/1989 as shown in FIGS. 1 to 3 is utilized to recognize the character for the check shown in FIG. 17, it is impossible to recognize the block comprising two characters. However, it is possible to find features for classifying written forms even if the block of which the bar and the numeral are in contact is included in numeral information.

A prior art method for recognizing numeral patterns includes the systems disclosed by the present inventor, for example, in Japanese Laid-Open Patent No. 116781/1989 and Japanese Laid-Open Patent No. 116782/1989. According to these systems, there may be a case where segmentation is not realizable for continuous numerals when reading the continuous numerals in structural analysis. The method for reading collectively to recognize from preparing and registering two-continuous patterns for two-continuous numerals involves an increase in number of the patterns, and to register so many patterns beforehand does not necessarily to lead to a ready recognition in many cases.

As a method of recognizing continuous numerals, the inventor has proposed the method for separating contact characters as disclosed in Japanese Laid-Open Patent No. 121988/1989. However, there is an unavoidable defect in such that since a procedure has shifted immediately to a recognition of the remaining clock upon recognition of the numerals, a segmentation of blocks according to this method does not keep a result of the erroneous recognition, if any, from being outputted immediately.

SUMMARY OF THE INVENTION

This invention has been achieved in consideration of the above discussed circumstances to overcome the problems encountered in the prior art. An object of this invention is to provide a character recognizing apparatus which recognizes characters by making use of classified arrangement types of the handwritten characters having definitive format in some degree, and determines the characters with reliability on the basis of the arrangement type.

The second object of this invention is to provide a method which can surely detect a bar contained in character information and extract the characters alone even when the bar is not written horizontally or linearly or when the bar per se is handwritten.

The third object of this invention is to provide a recognizing method wherein a plurality of segment patterns are obtained through continuing a segmentation further to a recognition realized by segments in a block, a plurality of candidates are obtained, from among of which an optimum one is selected to be an accurate recognition.

According to one aspect of this invention, for achieving the objects described above, there is provided a character recognizing apparatus which recognizes characters from information relating to a character set to be sensed by making use of knowledge base holding required rules for the recognizing and a reasoning mechanism performing a reasoning based on the knowledge base, comprising: a block extracting means for extracting a sole character block from the aforementioned character set to be recognized so as to assign block attributes to each character block; a block arrangement type extracting means for selecting, from among a plurality of the predetermined block arrangement types, candidates of the block arrangement type similar to the arrangement of the character block extracted by said block extracting means; an attribute assignment means for allotting a block attribute candidate to the aforementioned each block based on the block arrangement type extracted by the block arrangement type extracting means; and a verification means for verifying the candidate on the basis of the block arrangement type candidate and the block attribute candidate.

According to another aspect of this invention, there is provided a character extraction method comprising the processing steps of detecting a bar from character information including the bar, and separating said bar so as to extract characters, which is characterized in that end points are detected from said character information, the linear distance between two end points is detected, the number of dots connecting said end points is obtained, and said bar is detected based on the ratio of a shortest path length as against the effective path between any two end points, and the thus detected bar is separated in order to extract characters.

Further, according to still another aspect of this invention, there is provided a character extraction method which detects a bar contained in character information to recognize the characters in the information which is characterized in that a block comprising a group of continuous characters is extracted out of said character information, and the thus extracted block is divided into plural areas $Z_{(k, j)}$ (i=0~m, j=0~n), the number of vertical masks which are the vertical components forming the characters, of incline masks which are the incline components and of horizontal masks which are horizontal components are counted for each areas $Z_{(i, j)}$, a certainty factor of the block of containing a bar is obtained for each block based on the number of masks existing in each area $Z_{(i, j)}$, end points in the block having the higher certainty factor of containing a bar are detected, a linear distance between the thus detected end points and the effective path length or the number of dots between the end points are respective obtained, and the bar is detected based on the ratio of the shortest distance as against the effective path length between the end points to extract said characters.

Still further, according to another aspect of this invention, there is provided a method for recognizing continuous numerals through preprocessing in which these are factorized into elements such as loop consisting of a node and a branch, straight line and arc, the improvement characterized in that a block is segmented from one end side of said continuous numerals at a predetermined distance to recognition, an erasion erasure of said branch is performed in order of center of gravity from the other end side within said block and is repeated until the branch within said block becomes nil, numerals within said block are recognized, further the block remaining unsegmented is segmented likewise to recognition, and thus more than one numeral recognized result is obtained.

The nature, principle and utility of the invention will become more apparent from the following detailed description when read in conjunction with the accompanying drawings.

BRIEF DESCRIPTION OF THE DRAWINGS

In the accompanying drawings:

FIGS. 4A through 4G show the kinds of cent types;

FIGS. 10 to 12 are diagrams for explaining the method for determining the attribute based on the relative positional relationship;

FIG. 13 shows a table for the relative position code;

FIGS. 14 and 15 are views for illustrating the ichi-s-bar.

FIGS. 16A and 16B are flowcharts to show an example of the operation of this invention;

FIG. 17 is a chart to shown an example of handwritten characters;

FIGS. 18 and 19 are charts to explain the processing by dividing the subject area into blocks;

FIG. 20 is a chart to show thus divided area;

FIG. 30 is a view representing one example of continuous numerals;

FIGS. 32-35, FIGS. 36A to 36D, FIG. 39 and FIG. 40 are views for illustrating an operation of this invention;

FIG. 38 is a block diagram showing examples of a segment candidate and a numeral recognized result, a branch string.

DESCRIPTION OF THE PREFERRED EMBODIMENTS

Figure 6:
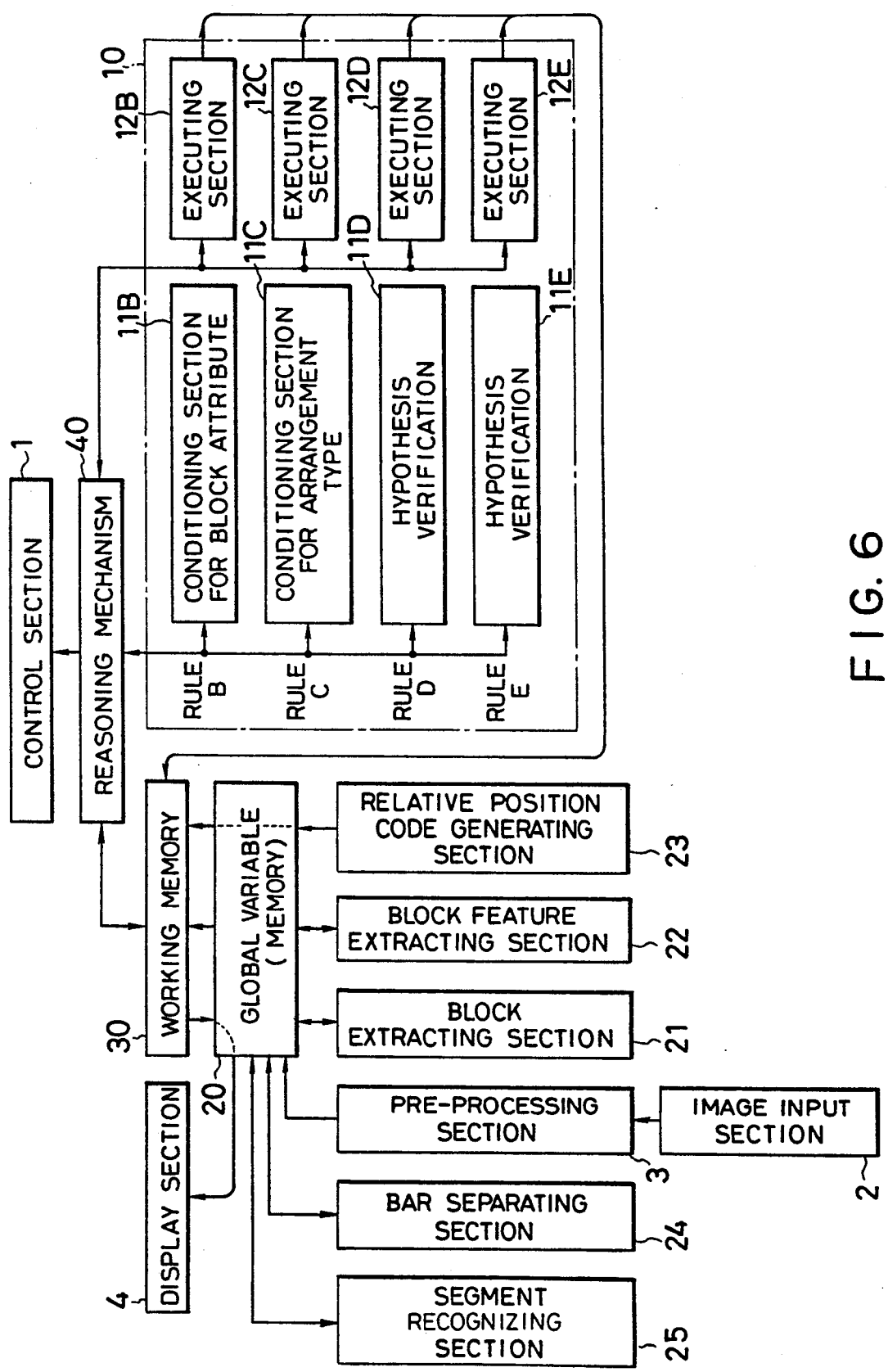
FIG. 6 is a block diagram showing the basic construction of this invention.

In FIG. 6 which shows an example of a construction according to this invention, a control section 1 composed of a CPU and the like is adapted to control the whole structure. A set of characters handwritten on a check or the like is optically read by an image input section 2 and subjected to the processings such as thinning and the like in a pre-processing section 3 to be inputted to a global variable (memory) 20. The global variable 20 is connected to a block extracting section 21, a block feature extracting section 22 and relative position code generating section 23 as well as a working memory 30 which holds variables of information representing the block features, the block attributes, the hypotheses of cent types, the flow of the recognition. In addition, a reasoning mechanism 40 is adapted to compare the content of the working memory 30 with a conditioning portion of a rule section in a knowledge base 10 to control the firing of the rule. The knowledge base 10 includes conditioning sections 11B to 11E for the rules B to E and executing sections 12B to 12E whose results are inputted to the working memory 30 and displayed through the global variable 20 on a display section 4. Besides, the conditioning section 11B functions for pre-assignment of the block attribute, the conditioning section 11C sets the conditions for arrangement type hypotheses, the conditioning section 11D carries out hypothesis verification 1 and the conditioning section 11E carries out hypothesis verification 2.

Figure 7:
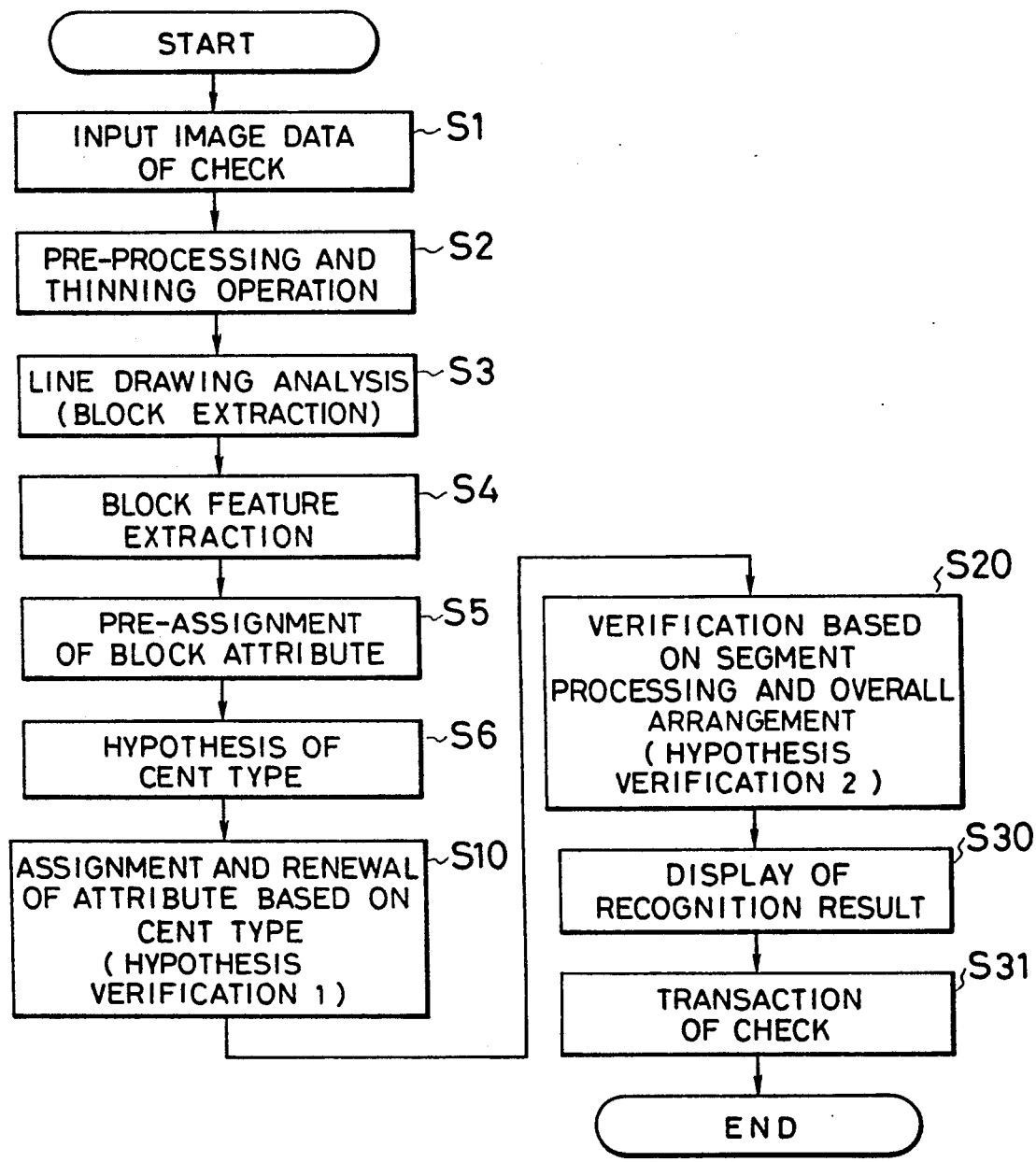
FIG. 7 is a flowchart explaining the operational example of the invention.

The character recognition method of this invention is carried out on the basis of the details described in Japanese Laid-Open Patent No. 116781/1989 and Japanese Laid-Open Patent No. 116782/1989 both proposed by the present applicant. FIG. 7 is a flowchart showing an operational example of the invention, and the recognition operation will be detailed referring to the flow chart.

Figures 1, 2, 3:
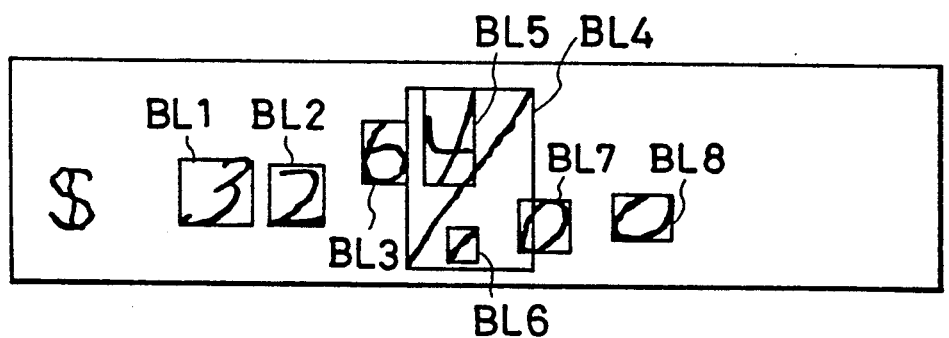
FIGS. 1 to 3 are diagrams for explaining the operation of the recognition of the check.
Figures 5A, 5B:
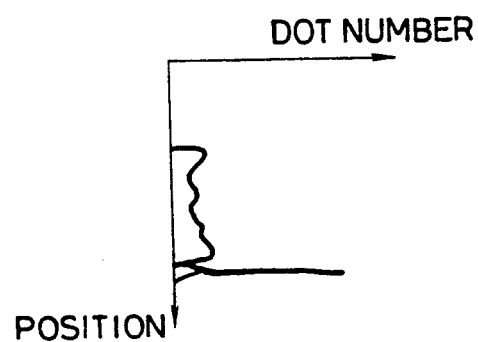
FIGS. 5A and 5B are views to explain the prior art extraction method of characters.
Figure 8:
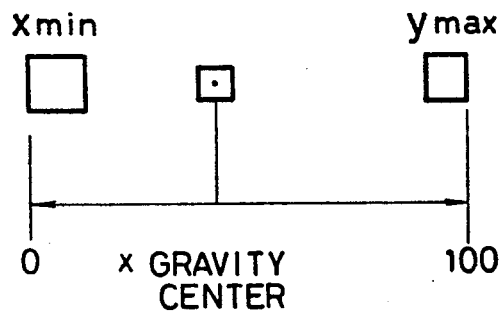
FIG. 8 is a diagram explaining the horizontal gravity center position.

First, an image data of a check as shown in FIG. 1 is inputted scanning by the image input section 2 (Step S1), and subjected to the pre-processing and the processing for the thinning as shown in FIG. 2 by means of the pre-processing section 3 (Step S2). Next to this operation, blocks BL1 to BL8 are extracted as shown in FIG. 3 by performing a line drawing structure analysis (Step S3). This block extraction is effected for the valid blocks. Here, a valid block is determined by the procedure wherein in the case that the average height of the blocks having four or more dots is defined as EF1 and the average height among the blocks having a height of more than EF1×0.9 is defined as EF2, blocks having a height of more than EF2×⅓ or blocks in which the number of dot is more than EF2×⅓ is defined as a valid block. Subsequently, the feature extraction is carried out for the blocks BL1 to BL8 (Step S4). In this connection, the futures of a block consist of the block height, the block width, the ratio of the height and the width, the horizontal gravity center position, the resultant of the character recognition, the appearance of a bar (the extent to which a pattern looks like a bar), the appearance of an under-bar, the appearance of an upper-bar, the appearance of a middle-bar, the appearance of an inclined bar, the appearance of an inclined under-bar and the appearance of an inclined upper-bar. The extent of a block height is represented by $\alpha 1 =$ (the height of the block)/EF2. When $\alpha 1 > 1.3$, the height is judged as "extremely high", when $\alpha 1 > 1.1$, it is judged as "considerably high", when $\alpha 1 > 0.9$, it is judged as "high", when $\alpha 1 > 0.7$, it is judged as "slightly low", when $\alpha 1 > 0.5$, it is judged as "low", when $\alpha 1 > 0.3$, it is judged as "considerably low" and when $\alpha 1 \geq 0$, it is judged as "extremely low". The extent of a block width is expressed by $\beta 1 =$ (block width)/EF2. When $\beta > 0.9$, the width is judged as "considerably wide", when $\beta \leq 0$, it is judged as "slender". The aspect ratio is represented by $\gamma 1 =$ height/width, when $\gamma 1 < 0.67$, the block is judged "considerably laterally long", when $\gamma 1 < 0.91$, it is judged as "laterally long", when $\gamma 1 < 1.43$, it is judged as "medium", otherwise it is judged as "longitudinally long". The horizontal gravity center position is represented by the variable ranging from 0 to 100" as shown in FIG. 8. The calculation method for the appearance of a bar, the appearance of an under-bar, the appearance of an upper-bar, the appearance of a middle-bar, the appearance of an inclined bar, the appearance of an inclined under-bar and the appearance of an inclined upper-bar will be described hereinafter.

Figure 9A:
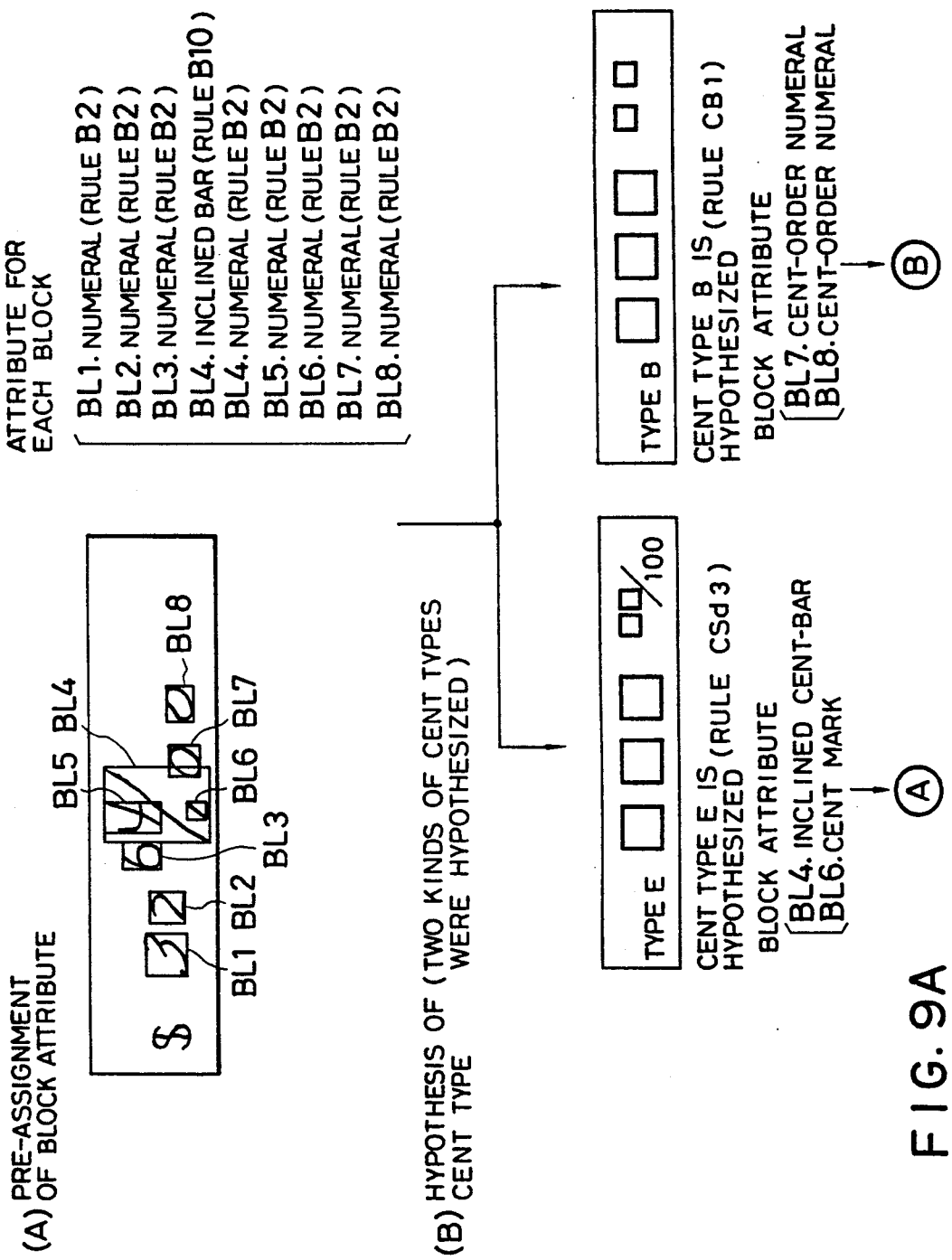
FIGS. 9A and 9B are schematic diagrams for explaining the operation of this invention.

When the feature extraction of the block is completed, the pre-assignment of the block attribute is carried out in such a manner of the series of rule sets B which include the description of the block attribute in a pre-assignment conditioning section 11B in the knowledge base 10 and the assignment of the of the block attribute in the executing section 12B therein (Step S5). For the blocks BL1 to BL8 shown in FIG. 3, the following attribute are assigned. More specifically, as shown in (A) of FIG. 9A, the attribute "numeral" is assigned for the block BL1 (rule B2), the attribute "numeral" is assigned for the block BL2 (rule B2), the attribute "numeral" is assigned for the block BL4 (rule B10), the attribute "numeral" is assigned for block BL4 (rule B2), the attribute "numeral" is assigned for block BL6 (rule B2), the attribute "numeral" is assigned for block BL7 (rule B2), and the attribute "numeral" is assigned for block BL8 (rule B2). The description in relation to the rules will be given hereinafter.

Next to these allocations of the block attribute, the hypothesis of the cent types as shown in FIGS. 4A to 4G is made on the basis of the rule sets C (Step S6). More specifically, the conditioning section 11C in the knowledge base 10 sets up the condition for the arrangement types including the block features, the block attribute and the relative position codes, and the executing section 12C proposes the hypothesis about the cent type by applying the rule sets C to the data. This process is carried out as shown in (B) of FIG. 9A. In FIGS. 4A through 4G, the term "dollar-order" represents the currency notation portion for larger than the decimal point (the cent-point), the "cent-point" represent the currency notation portion for smaller than the cent-point. In the same FIGS. 4C to 4F, each of cent types C to F has a "cent-bar". In addition, in FIGS. 4D to 4F, each of the cent types D to F have a respective "cent-mark" such as "100" or "xx". For the character recognition data shown in FIG. 3, the cent types E and B as shown in FIG. 4E or 4B are hypothesized and the proposed cent types are newly subjected to the assignment and renewal of the attribute (Step S10). Specifically, as the hypothesis about the cent type (Step S6), a pair of the hypotheses, that is, the cent type E and the cent type B are proposed respectively on the basis of the rule CSd3 and the rule CB1 both of which will be described hereinafter. With respect to the cent type E, the "cent-bar" and the "cent-mark" are assigned as attribute for the block BL4 and the block BL6 respectively. For the cent type B, the "cent-order numeral" is assigned as the attribute for the block BL7 and the block BL8, respectively.

Figure 9B:

Subsequently, the assigned attribute is renewed by applying the rule sets D. The conditioning section 11D for the hypothesis verification 1 is described by the cent type hypotheses, the block attributes, the block features and the the relative position codes, and the executing section 12D effects the renewal of the block features. If the character recognition data does not have any matching with any of the rule sets D, and consequently the effective block exists for which any attributes as a constituent elements of the cent type can not be assigned, the cent type hypothesis is to be rejected or abandoned (hypothesis verification 1). For the renewal of the attribute based on the cent type E, as described in (C) of FIG. 9B, the "cent-mark" is assigned for the block BL7 (rule DK3), the "cent-mark" for the block BL8 (rule DK4), the "cent-order numeral " for the block BL3 (rule Dd1), the "cent-order numeral" for the block BL5 (rule Dd1), the "dollar-order numeral" for the block BL1 (rule D1), and the "dollar-order numeral" for the block BL2 (rule D1). On the other hand, for the renewal of the attribute based on the cent type B, the "cent-point" is assigned for the blocks BL6 (rule DP1), the "dollar-order numeral" for the block BL1 (rule D1), the "dollar-order numeral" for the block BL2 (rule D1-1), the "dollar-order numeral" for the block BL4 (rule D1-1), the "dollar-order numeral" for the block BL3 (rule D1), and the "dollar-order numeral" for the block BL5 (rule D1-1). These renewal of the attribute and the verification of the hypothesis (Step S10) are followed by the segment processing and the hypothesis verification 2 based on the overall arrangement (Step S20). As shown in (D) of FIG. 9B, since the relative positional relationship between the blocks BL4, BL6 and BL8 is not allowed by the rule E-POS6, the aforementioned cent type hypothesis B is rejected. The hypothesis verification 2 is to be completed after the judgement is made as to whether or not the case falls into the rejection rule. The resultant of the recognition becomes to "32 dollars and 64 cents" by arranging the recognized results as the single numeral of the blocks BL1 an dBL2 assigned the attribute "dollar-order numeral" and the blocks BL3 and BL5 assigned the attribute "cent-order numeral" due to the above cent type hypothesis E which is remained above. The resultant of the recognition is displayed on a display section 4 (Step S30) to perform a required transaction for the check such as a deposit transaction (Step S31).

Now, the attribute to be given to an extracted blocks will be described as follows. The attribute of the block consists of "numeral", "including an (inclined) under-bar", "(inclined) bar", "continuous numerals", "cent-order low-continuous numerals", "including an (inclined) upper-bar" and "unknown". The attribute "numeral" is to be renewed or replaced by "dollar-order numeral", "cent-order numeral", "cent-mark" and "cent-point". The attribute "including an (inclined) under-bar" is to be renewed to "cent-order one-character including an (inclined) under-bar" or "cent-order two-characters including an (inclined) under-bar". Moreover, the attribute it is to be renewed by "cent-order numeral" and "(inclined) cent-bar". The attribute is replaced by "cent-order numeral", "cent-order numeral" and "(inclined) cent-bar". The attribute "(inclined) bar" is renewed by "(inclined) cent-bar" and the attribute "continuous numerals" are renewed to "dollar-order continuous numerals" or "cent-order continuous numerals". Moreover, the attribute "dollar-order continuous numerals" are replaced by "dollar-order numeral", and "dollar-order numeral" and the attribute "cent-order continuous numerals are replaced by "cent-order numeral" and "cent-order numeral". Furthermore, the attribute "unknown" is classified into "dollar-order numeral", "cent-order numeral", "cent-mark" or "cent-point".

Figure 10:
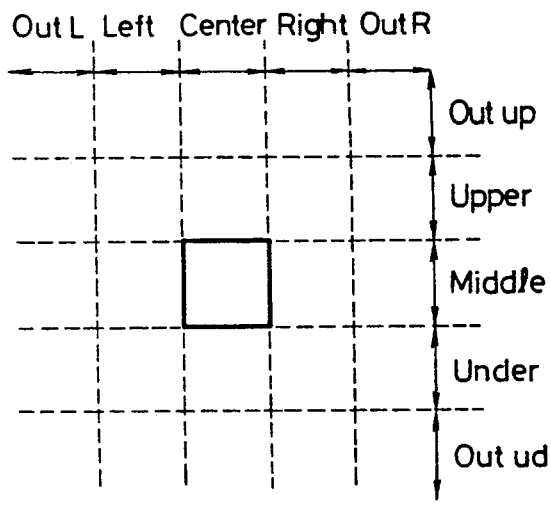
Figure 11:
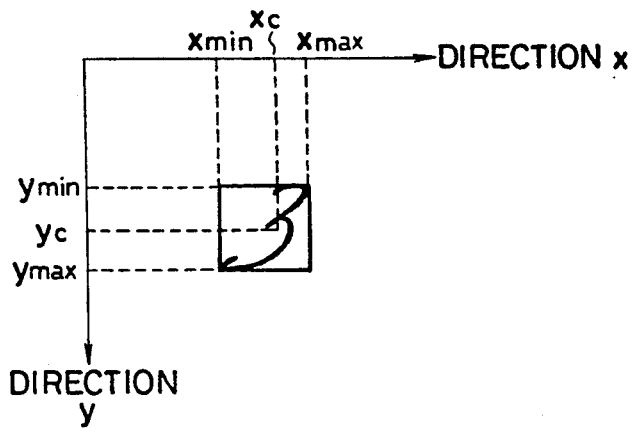

The detection of the attribute by the relative positional relationship is illustrated in FIG. 10 with the relative position map, and in FIG. 11 with the block position and shape. FIG. 12 shows an example in which the block BL4 is taken to be a reference block. The horizontal direction feature of the block BL6 is indicated by $X_{min}$=center, x gravity center=center and $x_{max}$=center. For its longitudinal direction, $y_{min}$=middle, y gravity center=middle and $y_{max}$=middle. Consequently, the relative position code of the block BL6 is represented by (26,26) according to FIG. 13. For the block BL7, the horizontal direction feature is expressed by $X_{min}$=center, x gravity center=right and $x_{max}$=-right, the longitudinal direction feature of that is indicated by $y_{min}$=middle, y gravity center=middle and $y_{max}$=middle, as a result the relative position code of the block is represented by (29,26) according to FIG. 13. The horizontal feature of the block BL8 is expressed by $X_{min}$=right, x gravity center=right and $x_{max}$=outR, the longitudinal feature is $y_{min}$=middle, y gravity center=middle, $y_{max}$=middle, as a result, the relative position code is represented as (33,26) according to FIG. 13. As shown in FIG. 13, the relative position is indicated by the combination of the longitudinal position and the horizontal position each of which has 35 variations. The relative position of the block BL6 to that of the block BL4 can be represented by using the combination above-mentioned, that is, the relative position code (26,26). By using this way of the representation, it is possible to express the relationships, in particular, of the numerals or the cent-mark to the cent-bar in a simple and exact manner. The relative position codes for expressing the relationships between the blocks are generated in the relative position code generating section 23 and passing through the global variable 20, stored in the working memory 30. The stored codes are compared with the previously registered codes of the rules in the conditioning section and used for the pre-assignment of the block attribute (Step S5), the hypothesis about the cent type (Step S6), the assignment and the renewal of the attribute based on the cent type (Step S10) and the verification on the basis of the segment processing and overall arrangement (Step S20). In the positional relationship as shown in FIG. 14, the relative position codes of both blocks b and c to the block a are represented by x=26, y=26. In order to express the vertical positional relationships of the blocks b and c to the block a, when a vertical line is extended upward or downward from an arbitrary point in each block b or c, if the extended line crosses the cent-bar upward as shown in FIG. 15, d is replaced by "u-d", i.e. d=u-d, if the extended line crosses the cent-bar downward, the u will be replaced by "u-d", i.e. u=u-d. Here, "u-d" may be used only for the case where x=25 and y=26.

Next, the rule applied in the knowledge base 10 for this invention will be described for each examples.

Rule B10;
In the conditioning section;
If there exists a block which has the following block features;
1. the block is effective,
2. the height of the block is "extremely high", "considerably high" or "high",
3. the horizontal gravity center position of the block is more than 30.
4. the appearance index of the inclined bar is more than 72.
In the executing section;
Then the attribute "inclined bar" is assigned for the block.

Rule B2;
In the conditioning section;
If
1. the block is effective,
2. the height of the block is "extremely high", "considerably high", "high", "slightly low", "low" or 'considerably low",
3. the appearance of the character is "likely to be a numeral" or "a numeral",
In the executing section;
Then the attribute "numeral" is given.

Rule CSd3;
In the conditioning section;
If there is a block ($\alpha$) belonging to the attribute "inclined bar" with another effective block ($\beta$) in the right lower position (ichi-s-bar) thereof. Here, the block $\alpha$ should have a horizontal gravity center of more than 40.
In the executing section;
The attribute "inclined cent-bar" is assigned for the block $\beta$ and the hypothesis of the cent type E is to be generated.

Rule CB1;
In the conditioning section;
1. if the first effective block ($\alpha$) and the second effective block ($\beta$) from the right end belong to the attribute "numeral" or "small numeral",
2. if both the blocks $\alpha$ and $\beta$ have a high attribute "slightly low", "low", "considerably low", or "extremely low" and the relation (x gravity center of the block $\alpha$)<(y gravity center of the block $\beta$) is filled,
3. If there is a block $\gamma$ closed to the left side of the above mentioned blocks $\alpha$ an d$\beta$, the block $\gamma$ which has an attribute "numeral" or "continuous numerals", and the relation {(x gravity center of $\alpha$)−(x gravity center of $\beta$)}<3×(height of the block $\gamma$) is filled; and
4. if the height of the block $\gamma$ is 50% larger than that of the block $\alpha$ or $\beta$.
In the executing section;

The attributes of the blocks $\alpha$ and $\beta$ are renewed to "cent-order numerals" and the cent type B is hypothesized.

Rule DK3;
In the conditioning section;
If when the cent type E is hypothesized, there is an effective block in the right lower position (ichi-s-bar) of the block which as the attribute "inclined cent-bar".
In the executing section;
The attribute "cent-mark" is assigned for the effective block and assumed to be the cent mark block in the cent type E.

Rule Dd1;
In the conditioning section;
If when the cent type E which has a "inclined cent-bar" block is hypothesized, there is a block ($\alpha$) having an attribute "numeral" or "small numeral" in the left upper position (ichi-s-Dd1) of the "inclined cent-bar" block,
In the executing section;
The attribute of the block $\alpha$ is renewed to "cent-order numeral" and assumed to be the cent-order numeral block of the cent type E.

Rule D1;
In the conditioning section;
If for all kinds of the cent types, when there are two "cent-order numeral" blocks (to be referred to as $\alpha$ and $\beta$), a third block $\gamma$ having the attribute "numeral" is located so as to fill the following relationship:
x gravity center of the block $\gamma$<x gravity center of the blocks $\alpha$ and $\beta$,
height of the block $\gamma$>90% of the height of the block $\alpha$ or $\beta$.
In the executing section;
The attribute of the block $\gamma$ is renewed to "dollar-order numeral".

Rule D1-1;
In the conditioning section;
If for all kinds of the cent types, a block $\alpha$ having the attribute "dollar-order numeral" and two blocks $\beta$ and $\gamma$ having the attribute "cent-order numeral", there exists a block $\delta$ having the attribute "numeral" and the following positional relation is filled;
x gravity center of $\alpha$<x gravity center of $\delta$,
the relative position code of $\alpha$ to the block $\delta$;

code-y=11, 20, 21, 26, 27.

In the executing section;
The attribute of the block $\delta$ is renewed to "dollar-order numeral".

Rule DP1;
In the conditioning section;
If for all the cent types, when two blocks $\alpha$ and $\beta$ having the attribute "cent-order numeral" exist (here, x gravity center of $\alpha$<x gravity center of $\beta$ is to be filled) there are two blocks having the attribute "numeral" ($\gamma$ and $\delta$; x gravity center of $\gamma$<x gravity center of $\delta$<x gravity center of $\alpha$ is to be filled), the resultant of the character recognition of $\delta$ is "1", "2" or "6" and the height of $\delta$ is "considerably low" or "extremely low", and smaller than $\gamma$, the position of $\delta$ fills the relationship;
$y_{min}$ of $\delta$>y gravity center of $\gamma$.

In the executing section;
The attribute of the block δ is renewed to "cent-point".

Rule E-POS6;
In the conditioning section;
If the cent type B is hypothesized, and there are two blocks α and β having the attribute "dollar-order numeral" and a block γ having the attribute "cent-order numeral", and the following relations are filled among α, β and γ; the relative position code of γ to β is ichi-s-bar,
the relative position code of α to β is ichi-s-Dd1.

Here ichi-s-bar denotes the positional relationship between an inclined under-bar and the lower block, and the relative position code is represented by (x=26, y=26, u-d=d), (x=26, y=27), x=27, y=26) or (x=29, y=26), Ichi-s-Dd1 denotes the positional relationship between an inclined under-bar and the loft upper cent-order numeral, and the relative position code is represented by (x=26, y=26, u-d=d), (x=20, y=26), (x=17, y=26), (x=17, y=20), (x=26, y=20), (x=26, y=17) or (x=20, y=20).

In the executing section;
The hypothesis of the cent type is abandoned.

As detailed above, since the character recognizing apparatus of this invention recognizes characters by achieving the classification of the handwritten characters having a definitive format in certain degree with respect to the arrangement type of the characters; and by hypothesizing the arrangement type to which the character set belongs and performing the recognition on the basis of the hypothesis, it is possible to recognize and discriminate reliably without error characters which have a great similarity one to another, for example, the numeral "1" and the "inclined bar".

Next, the calculation method for the appearance of a bar, the appearance of an under-bar, the appearance of an upper-bar, the appearance of a middle-bar, the appearance of an inclined bar, the appearance of an inclined under-bar and the appearance of an inclined upper-bar will be explained below, and further the processing method in the case of contacted bar and numeral, and contacted numerals will be explained.

This invention embodiment relates to a method which automatically detects a cent-bar which is provided to surely distinguish the dollar-order from the cent-order in recognizing the amount of money which is handwritten on a U.S. check shown in FIG. 17 or FIGS. 26A through 26F. By detecting the cent-order, the method can recognize the dollar-order and the cent-order.

Figure 16B:
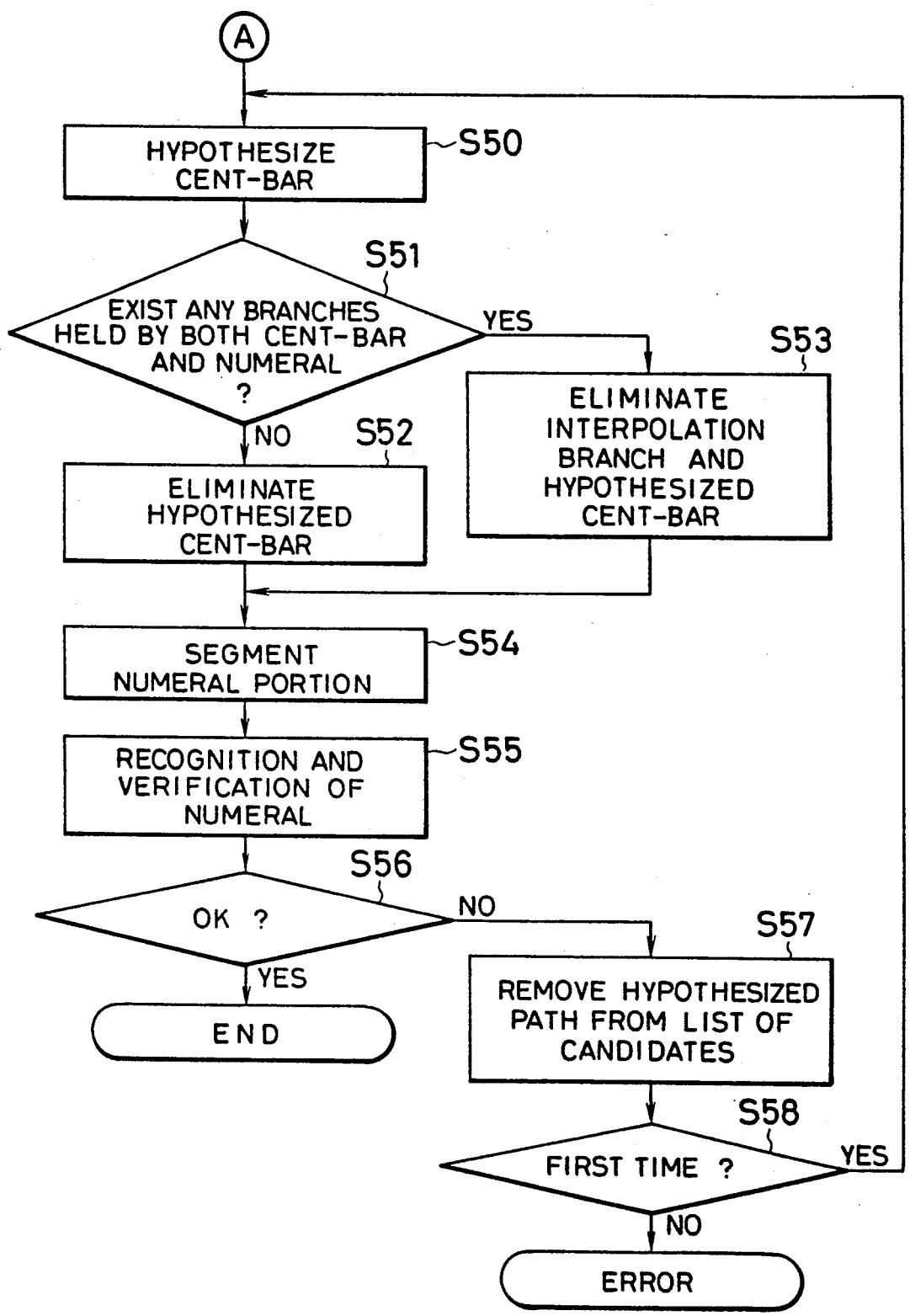

FIGS. 16A and 16B are flowcharts to show the operation of this invention method which can roughly be classified into the step of detecting a region which includes a bar in the character information and that of recognizing the characters based on the positional relationship between the detected bar and respective characters. The method is described more specifically referring to a check shown in FIG. 17 and in the order of the flowcharts in FIGS. 16A and 16B.

FIG. 18 shows one example of the extracted blocks by using the Steps S1 to S3 in FIG. 7 for the dollar money amount of a check as shown in FIG. 17. Although the blocks are extracted at the next Step S4, the calculation method for certainty factor including the bar which is one feature of the block will be described. That is, when blocks are extracted in this manner from the character information of FIG. 17, seven blocks are extracted as shown in FIG. 18. The blocks are numbered as BL11 to BL17 from the extreme left. Extraction of blocks may be conducted by the method disclosed in the Japanese Laid-Open Patent No. 233585/1989. When the extraction of the blocks is completed, the step goes to calculation of the certainty factor of whether a block includes a bar. Each of the blocks BL11 through BL17 is divided into nine matrix areas of 3×3 as shown in FIG. 20. For example, the block BL14 is divided into nine areas $Z_{(i, j)}$ as shown in FIG. 19. The number of vertical masks $ZV_{(i, j)}$, the number of inclined masks $ZS_{(i, j)}$ and the number of horizontal masks $ZH_{(i, j)}$ are obtained for each area $Z_{(i, j)}$ as shown in FIG. 20.

The reason why a block is divided into nine areas is because the type of a bar should be judged in addition to its presence/absence. More specifically, the type of the bar can be judged based on the probability information for the position of a bar within a block. For example, if the bar is present in the lower areas ($Z_{(0, 2)}$, $Z_{(1, 2)}$, $Z_{(2, 2)}$) of a block, it is judged to be an under-bar. When it exists in the upper areas ($Z_{(0, 0)}$, $Z_{(1, 0)}$, $Z_{(2, 0)}$) of the block, it is judged to be an upper-bar. Similarly, when it exists in the middle areas ($Z_{(0, 1)}$, $Z_{(1, 1)}$, $Z_{(2, 1)}$) of the block, it is judged to a middle bar. When it exists in areas arranged obliquely ($Z_{(0, 0)}$, $Z_{(1, 1)}$, $Z_{(2, 2)}$) or ($Z_{(2, 0)}$, $Z_{(1, 1)}$, $Z_{(0, 2)}$), it is judged to be an inclined bar, and inclined under-bar, or an inclined upper-bar. The type of a bar, e.g. an under-bar, an upper-bar, an inclined bar, an inclined under-bar, and an inclined under-bar can be distinguished.

A mask will now be described. A mask is composed of nine dots of a 3×3 matrix. The mask pattern of the dot mask which would form a vertical component of the dot character information is called a vertical mask, the mask pattern which would form a horizontal component thereof is called a horizontal mask, and the mask pattern which would form an inclined component thereof is called an inclined mask.

Figure 21:
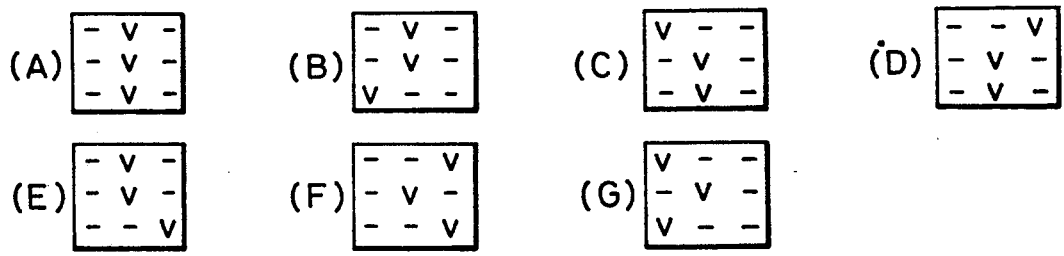
FIG. 21 is a view to show examples of vertical mask.
Figure 22:
FIG. 22 is a view to show examples of incline masks.
Figure 23:
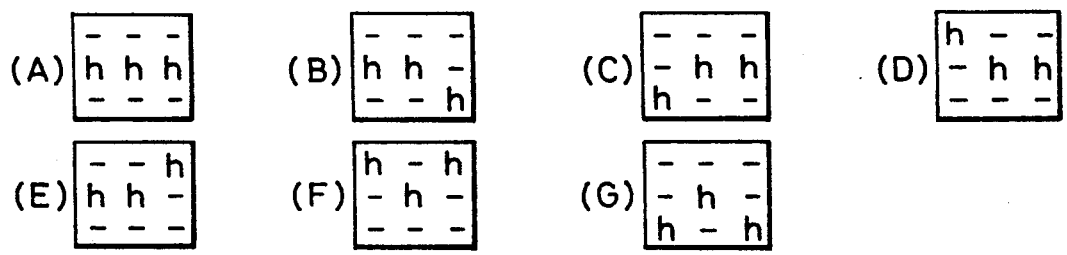
FIG. 23 is a view to show examples of horizontal masks.

There are 7 types of vertical masks as shown in FIG. 21, 2 types of inclined masks as shown in FIG. 22, and 7 types of horizontal mask as shown in FIG. 23. Although the above masks comprise 3×3 dots, the size of a matrix is not limited to it as long as it is larger than 3×3. The number of vertical mask $ZV_{(i, j)}$ within a block is obtained by scanning the vertical masks in each area $Z_{(i, j)}$; the number of inclined masks is obtained by scanning the inclined masks in each area $Z_{(i, j)}$, and the number of horizontal masks is obtained by scanning the horizontal masks in each area $Z_{(i, j)}$. Then, the certainty factor that a block should include a bar is calculated for each of the blocks. More particularly, the certainty factor is calculated below.

The certainty factor α of an under-bar is calculated after extracting an underline according to the formulas shown below.

$$\text{ud-hline}[0] = ZH(0, 2) + ZH(1, 2) + ZH(2, 2) - \quad (1)$$
$$(ZS(0, 2) + ZS(1, 2) + ZS(2, 2))/2 -$$
$$(ZV(0, 2) + ZV(1, 2) + ZV(2, 2))/2$$

$$\text{ud-hline}[1] = ZH(0, 2) + ZH(1, 2) + ZH(2, 1) - \quad (2)$$
$$(ZS(0, 2) + ZS(1, 2) + ZS(2, 1))/2 -$$
$$(ZV(0, 2) + ZV(1, 2) + ZV(2, 1))/2$$

-continued $$\text{ud-hline}[2] = \quad ZH(0,1) + ZH(1,2) + ZH(2,2) - \quad (3)$$
$$(ZS(0,1) + ZS(1,2) + ZS(2,2))/2 -$$
$$(ZV(0,1) + ZV(1,2) + ZV(2,2))/2$$

The extracted data for the underline thus obtained, ud-hline[0], ud-hline[1], and ud-hline[2] are used to obtain the certainty factor $\alpha$ of the under-bar in accordance with the formula shown below.

$$\alpha = K_1 \cdot \text{MAX[ud-hline[0], ud-hline[1], ud-hline[2]]/(total number of black pixels in a block)} \quad (4)$$

wherein $0 \leq \alpha \leq 1$, and $K_1$ is a constant.

Similarly, the certainty factor $\beta$ of an upper-bar is obtained by extracting an upper line in accordance with the formulas shown below, and calculating it by the formula (8)

$$\text{up-hline}[0] = \quad ZH(0,0) + ZH(1,0) + ZH(2,0) - \quad (5)$$
$$(ZS(0,0) + ZS(1,0) + ZS(2,0))/2 -$$
$$(ZV(0,0) + ZV(1,0) + ZV(2,0))/2$$

$$\text{up-hline}[1] = \quad ZH(0,1) + ZH(1,0) + ZH(2,0) - \quad (6)$$
$$(ZS(0,1) + ZS(1,0) + ZS(2,0))/2 -$$
$$(ZV(0,1) + ZV(1,0) + ZV(2,0))/2$$

$$\text{up-hline}[2] = \quad ZH(0,0) + ZH(1,0) + ZH(2,1) - \quad (7)$$
$$(ZS(0,0) + ZS(1,0) + ZS(2,1))/2 -$$
$$(ZV(0,0) + ZV(1,0) + ZV(2,1))/2$$

$$\beta = K_2 \cdot \text{MAX[up-hline[0], up-hline[1], up-line[2]]/(total number of black pixels in a block)} \quad (8)$$

wherein $0 \leq \beta \leq 1$, and $K_2$ is a constant.

The certainty factor $\gamma$ of a middle bar is obtained by calculating according to the formula below, and then by the formula (9).

$$\text{md-hline}[0] = ZH(0,1) + ZH(1,1) + ZH(2,1)$$

$$\gamma = K_3 \cdot \text{md-hline[0]/(number of pixels in the lateral width of a block)} \quad (9)$$

wherein $0 \leq \gamma \leq 1$, and $K_3$ is a constant.

Further, the certainty factor $\delta$, of an inclined bar, the certainty factor $\delta_2$ of an inclined under-bar, and the certainty factor $\delta_3$ of an inclined upper-bar are obtained as stated below. The certainty factor of the inclined bar $\delta_1$ is obtained by calculating according to the formula below, and then by the formula (11)

$$\text{s-bar}[0] = -3 \cdot ZV(0,0) - 1 \cdot ZV(1,0) + 1 \cdot ZV(2,0) \quad (10)$$
$$1 \cdot ZV(0,1) + 1 \cdot ZV(1,1) - 1 \cdot ZV(2,1) +$$
$$1 \cdot ZV(0,2) - 1 \cdot ZV(1,2) - 3 \cdot ZV(2,2) -$$
$$3 \cdot ZS(0,0) - 1 \cdot ZS(1,0) + 1 \cdot ZS(2,0) -$$
$$1 \cdot ZS(0,1) + 1 \cdot ZS(1,1) - 1 \cdot ZS(2,1) +$$
$$1 \cdot ZS(0,2) - 1 \cdot ZS(1,2) - 3 \cdot ZS(2,2) -$$
$$3 \cdot ZH(0,0) - 1 \cdot ZH(1,0) + 1 \cdot ZH(2,0) -$$
$$1 \cdot ZH(0,1) + 1 \cdot ZH(1,1) - 1 \cdot ZH(2,1) +$$
$$1 \cdot ZH(0,2) - 1 \cdot ZH(1,2) - 3 \cdot ZH(2,2)$$

$$\delta_1 = K_4 \cdot \text{s-bar[0]/(number of pixels in the lateral width of a block)} \quad (11)$$

wherein $0 \leq \delta_1 \leq 1$, and $K_4$ is a constant.

The certainty factor $\delta_2$ of an inclined under-bar is obtained in accordance with the formulas (12) and (13)

$$\text{s-us-bar}[0] = +0 \cdot ZV(0,0) + 0 \cdot ZV(1,0) + 1 \cdot ZV(2,0) - \quad (12)$$
$$0 \cdot ZV(0,1) + 1 \cdot ZV(1,1) - 1 \cdot ZV(2,1) +$$
$$1 \cdot ZV(0,2) - 1 \cdot ZV(1,2) - 3 \cdot ZV(2,2) -$$
$$0 \cdot ZS(0,0) + 0 \cdot ZS(1,0) + 1 \cdot ZS(2,0) -$$
$$0 \cdot ZS(0,1) + 1 \cdot ZS(1,1) - 1 \cdot ZS(2,1) +$$
$$1 \cdot ZS(0,2) - 1 \cdot ZS(1,2) - 3 \cdot ZS(2,2) +$$
$$0 \cdot ZH(0,0) + 0 \cdot ZH(1,0) + 1 \cdot ZH(2,0) +$$
$$0 \cdot ZH(0,1) + 1 \cdot ZH(1,1) - 1 \cdot ZH(2,1) +$$
$$1 \cdot ZH(0,2) - 1 \cdot ZH(1,2) - 3 \cdot ZH(2,2)$$

$$\delta_2 = K_5 \cdot \text{s-ud-bar[0]/(number of pixels in the lateral width of one block)} \quad (13)$$

wherein $0 \leq \delta_2 \leq 1$, and $K_5$ is a constant.

The certainty factor $\delta_3$ of an inclined upper-bar is calculated in accordance with the formulas (14) and (15).

$$\text{s-up-bar}[0] = -3 \cdot ZV(0,0) - 1 \cdot ZV(1,0) + 1 \cdot ZV(2,0) - \quad (14)$$
$$1 \cdot ZV(0,1) + 1 \cdot ZV(1,1) + 0 \cdot ZV(2,1) +$$
$$1 \cdot ZV(0,2) + 0 \cdot ZV(1,2) + 0 \cdot ZV(2,2) -$$
$$3 \cdot ZS(0,0) - 1 \cdot ZS(1,0) + 1 \cdot ZS(2,0) -$$
$$1 \cdot ZS(0,1) + 1 \cdot ZS(1,1) + 0 \cdot ZS(2,1) +$$
$$1 \cdot ZS(0,2) + 0 \cdot ZS(1,2) + 0 \cdot ZS(2,2) -$$
$$3 \cdot ZH(0,0) - 1 \cdot ZH(1,0) + 1 \cdot ZH(2,0) -$$
$$1 \cdot ZH(0,1) + 1 \cdot ZH(1,1) + 0 \cdot ZH(2,1) +$$
$$1 \cdot ZH(0,2) + 0 \cdot ZH(1,2) + 0 \cdot ZH(2,2)$$

$$\delta_3 = K_6 \cdot \text{s-up-bar[0]/(number of pixels in the lateral width of a block)} \quad (15)$$

wherein $0 \leq \delta_3 \leq 1$, and $K_6$ is a constant.

It is judged whether or not the certainty factors have been calculated for all the blocks in FIG. 18, and after the completion of the extraction of the blocks, the preassignment (Step S5) using the knowledge base 10 and the reasoning mechanism 40, the hypothesis (Step S6) of the cent type and the assignment and renewal (Step S10) of the attribute of the block on the cent type are performed in the same manner of the example shown in FIG. 1 Only the hypothesis for the cent type E is not abandoned and remains as a result of verification based on the overall arrangement of block at the Step S20. According to the hypothesis for the cent type, the attributes of blocks BL11 to BL17 are as follows; the blocks BL11 is "dollar-order numeral", the block BL12 "dollar-order continuous numerals", the block BL13 "cent-order numeral", the block BL14 "cent-order one-character including an inclined under-bar", and the attributes of the blocks BL15 to BL17 are "cent-mark".

At the next hypothesis verification 2 (Step S20), the block corresponding to two or more characters is found by the attribute assigned to each block and then segment processing is performed. That is, if the attribute assigned to the block is "cent-order one-character including an under-bar", "cent-order two-character including an under-bar", "cent-order one-character including an inclined under-bar" or "cent-order two-character including an inclined under-bar", the block includes the cent-bar. At this time, the block having four the above attributes are found, the bar is separated from the block and then the numerals are extracted. In the case of FIG. 18, the block BL14 having the attribute "cent-order one-character including an inclined under-bar" is extracted. The processing method of the bar separation will be explained with reference to FIGS. 16A and 16B.

Figure 24:
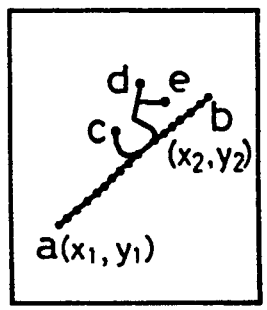
FIG. 24 is an explanatory view to shown an effective path, shortest path length and linearity between end points.
Figure 27:
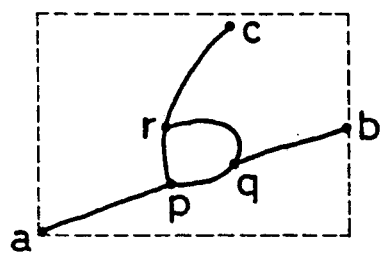
FIGS. 27 and FIGS. 28A through 28D are views to show path lengths between end points, respectively.
Figure 28A:
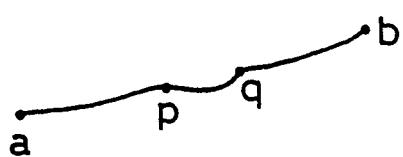
Figure 28B:
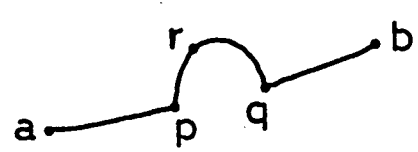
Figure 28C:
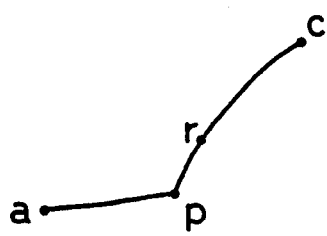
Figure 28D:
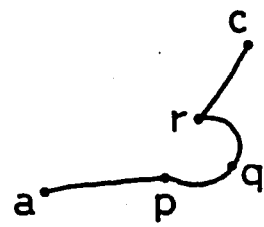

First, the extracted block is inputted to a bar separating section 24 from the global variable 20, and end points within the block are extracted (Step S40). However, only two end points of a bar having the horizontal length which is more than a half of the lateral width of the block are judged effective and end points of extremely short bars are disregarded. For instance, for the block BL14 shown in FIG. 19, four sets end points, e.g. a (x1,y1) and b (x2,y2), a and c, a and d, and a and e are extracted as shown in FIG. 24, and effective path lengths $P_k$ ($k=1 \sim n$; wherein n is the number of sets of two end points) are obtained (Step S41). The effective path length $P_k$ is a distance (or the number of dots) over which the line drawing between two end points extends continuously. If there are plural paths between the end points, the shortest path length is considered as $P_k$. For instance, in the block shown in FIG. 27, two paths exit between the end points a and b as shown in FIGS. 28A and 28B while there are two paths between the end points a and c as shown in FIGS. 28C and 28D. The shortest paths for each distance, i.e. the path a-p-q-b (FIG. 28A) and the path a-p-r-c (FIG. 28C) are used. The linear distance $D_k$ between the end points is obtained by the formula (16) (Step S42)

$$D_k = \sqrt{(x_2 - x_1)^2 + (y_2 - y_1)^2} \quad (16)$$

and the linearity $S_k$ of respective paths is obtained by the formula (17) (Step S43).

$$S_k = D_k/P_k \quad (17)$$

The step is repeated until the linearity $S_k$ has been calculated for all the paths (Step S44). When the linearity $S_k$ is obtained for all paths, a path having the highest linearity is hypothesized to be cent-bar (Step S50).

Figure 25:
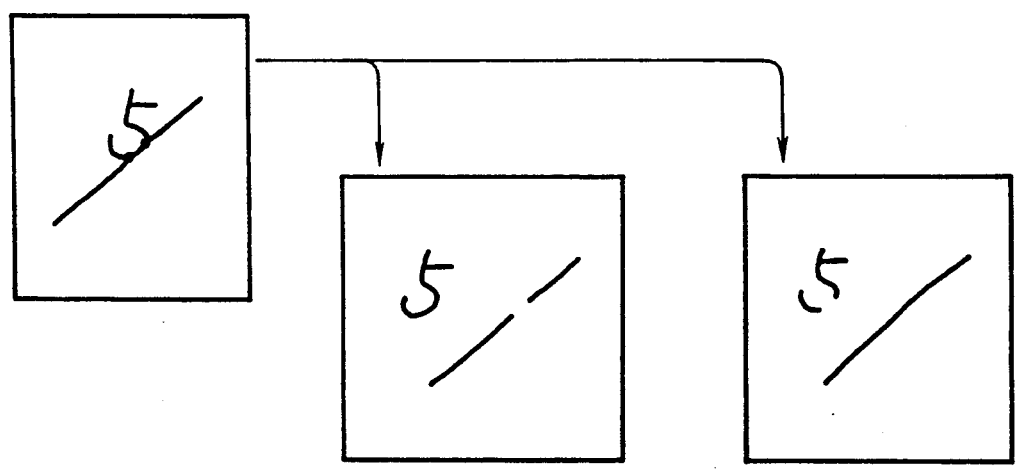
FIG. 25 is a view to explain the processing based on assumption.
Figure 26A:
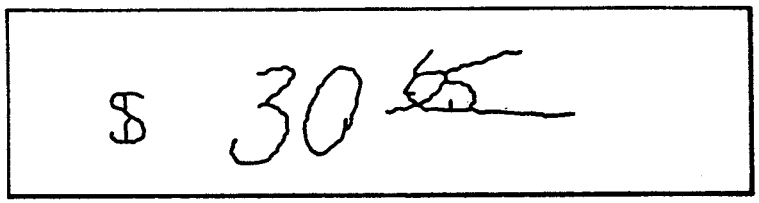
FIGS. 26A through 26F are views to show examples of handwritten characters.
Figure 26B:
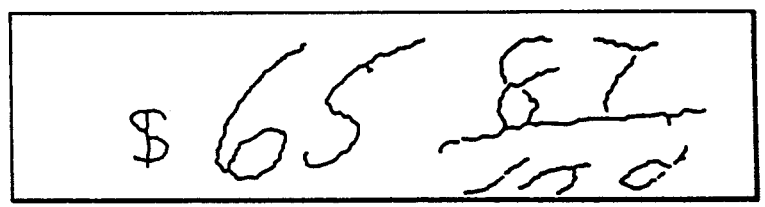
Figure 26C:
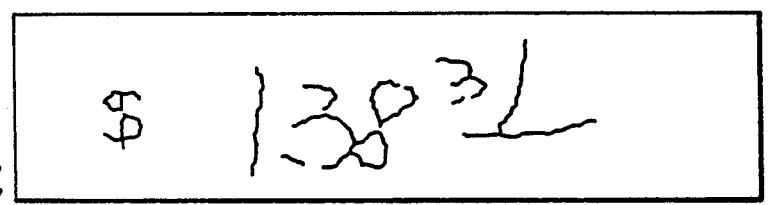
Figure 26D:
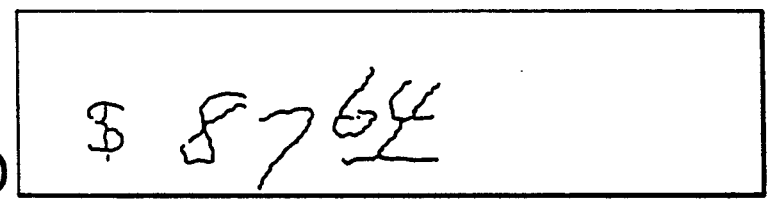
Figure 26E:
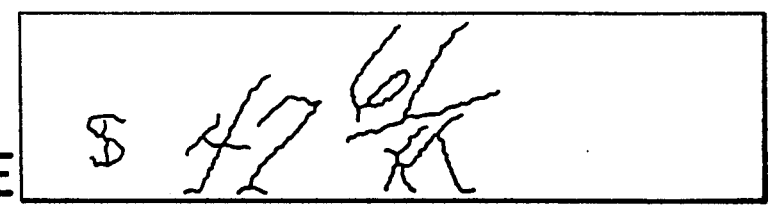
Figure 26F:
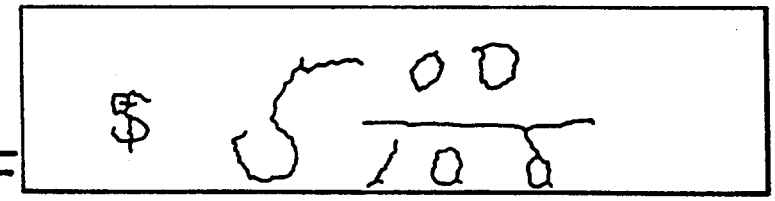

It is then judged whether or not the hypothesized cent-bar has any branch which is shared commonly with a numeral (Step S51). If there is such a branch, the hypothesized cent-bar is eliminated except for the shared branch (Step S53). This is to deal with the case where a bar overlaps with a numeral figure. If there is no branch which is commonly shared with a numeral figure, the hypothesized cent-bar is eliminated from the block (Step S52). FIG. (D) in FIG. 25 shows a case where a cent-bar which is hypothesized for the block (A) shown in FIG. 25 is eliminated except for the shared branch while the block (C) in FIG. 25 shows a case where the hypothesized cent-bar is eliminated.

Subsequently, the continuous numeral is segmented by the method which will be explained hereinafter for the segment numeral portion (Step S54), the numeral figure is recognized and verified (Step S55), and the recognition and verification are judged effective or not (Step S56). If the recognition and verification are not affirmatively judged, the hypothesized path is removed out of the list of candidates (Step S57), and the procedure returns to the Step S50 above. If a path is removed from the list of candidates twice or more, the path is treated as an error (Step S58). In this manner, the segmentation for the block including the bar is performed.

However, the block of which numerals are contacted each other is not segmented yet and is remained. This block could be judged according to the assigned attributes and the attributes of the block consisting of two or more characters are "dollar-order continuous numerals", "cent-order continuous numerals" and "cent-order low-continuous numerals". The segmentation of the continuous numerals is performed for the block assigned the above three attributes. In the case of FIG. 18, only the attribute of the block BL12 falls under the attribute representing the above continuous numerals, the segmentation of the continuous numeral is performed for the block BL12 and then is separated into two numerals "3" and "8".

According to the above operations, all numerals in dollar-order and cent-order are separated and recognized, and the recognized result is displayed (Step S30 in FIG. 7). Then, check transaction is performed (Step S31) and the operation is completed. If the error processing is occurred at the above bar separating process or the segmentation, the recognition of the money amount becomes rejection and the "reject" is displayed at the Step S30. An operator can see the display and input necessary information.

As stated in detail in the foregoing, the character extraction method according to this invention is capable of precisely recognizing characters even if the characters contact a bar because the bar is detected based on the ratio of the linear distance as against the effective path length of any two end points, and the bar is eliminated from the block for recognizing the characters. Even the characters such as shown in FIGS. 26A through 26F can be recognized according to this invention.

The segmentation method for the continuous numeral will now be described below.

Figure 29:
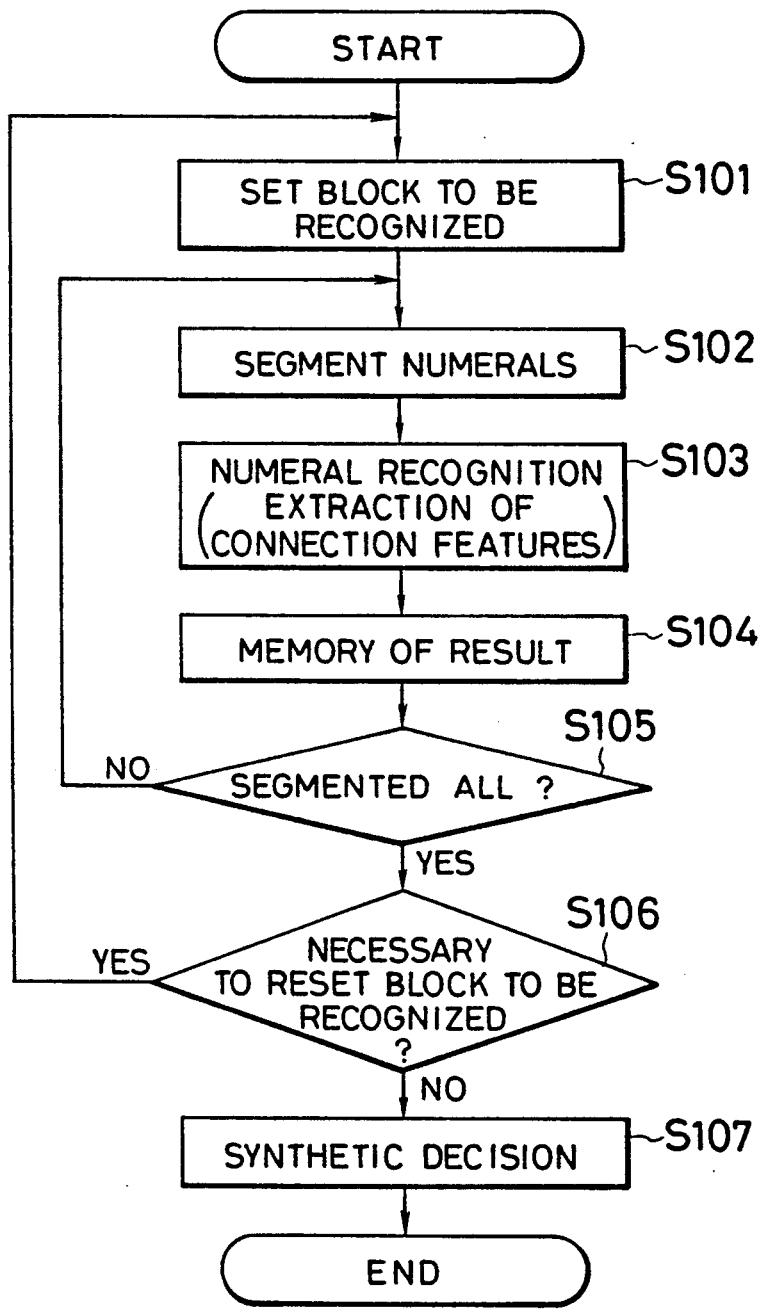
FIG. 29 is a flowchart representing one example of this invention.

The flowchart of FIG. 29 indicates a schematic operation of one embodiment of this invention, wherein a block to be recognized is set first (Step S101). At first continuous numerals are given wholly in the block to be recognized, and the numerals are segmented (Step S102). The segmentation is to eliminate the branch with the center of gravity positioned on the extreme right successively, one piece is eliminated to a numeral recognition (Step S103), and when the numerals can be recognized in this case, the feature of a connected relationship with the eliminated branches is also extracted, the result is stored (Step S104), the branches are eliminated one by one successively to recognition, and if the numerals can be recognized on the way, the segmentation is carried out repeatedly (Step S105), and when all segmentations are over, whether or not the block to be recognized must be reset next is decided (Step S106). That is, whether or not the portion (on the right side) left after eliminating a numeral portion recognized right now from the block for continuous numerals is still present is viewed, and if so, then the whole right side of the portion recognized right now is reset as a block to be recognized, the process from the Step S101 to the Step S106 is repeated, and that from the Step S101 to the Step S106 is also carried out all for each recognized result, and whenever all is over, the continuous numerals are decided synthetically on what they read according to recognized result obtained so far, connection feature and generally layout feature and so forth (Step S107).

Figure 31A:
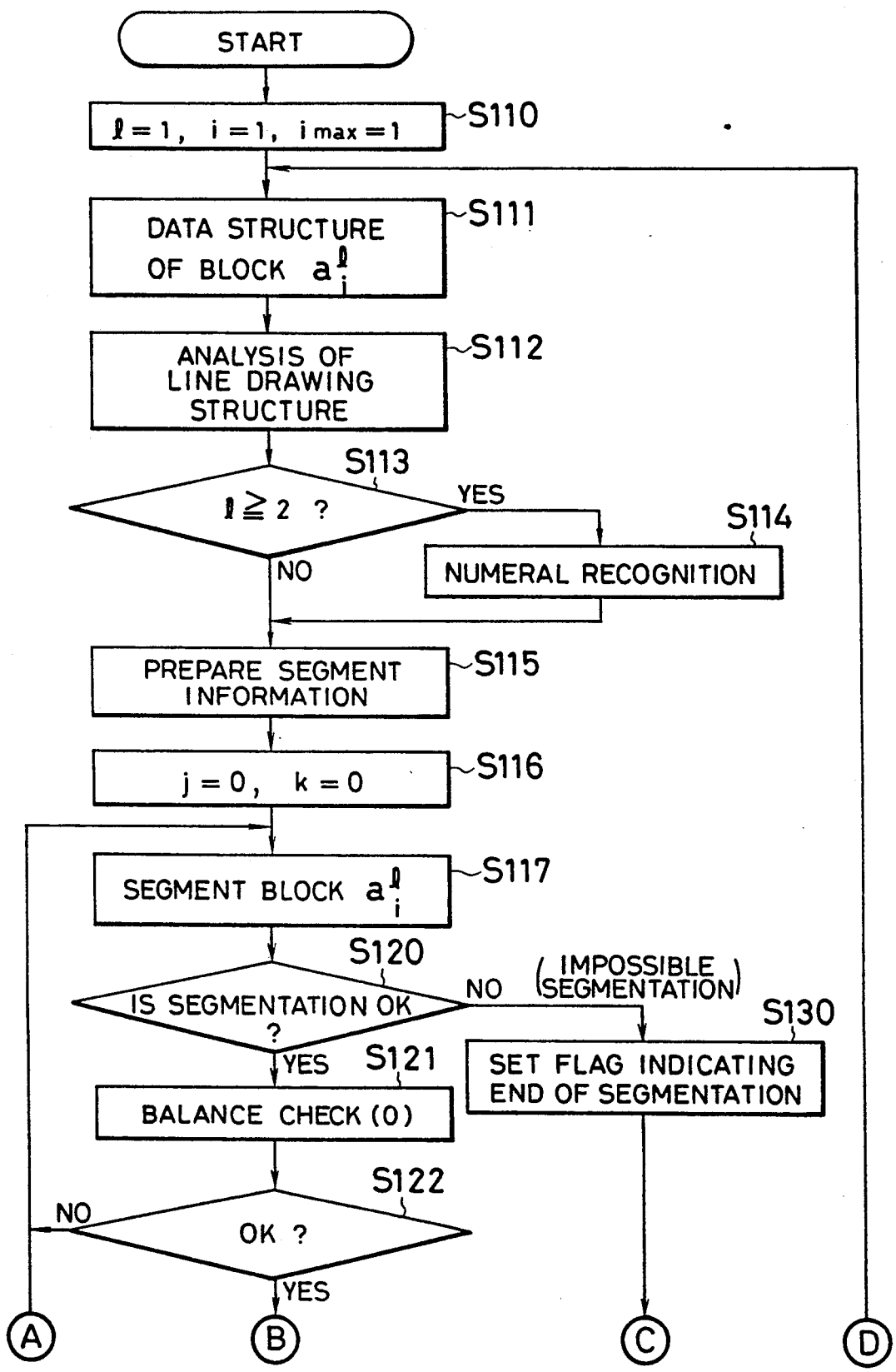
FIGS. 31A and 31B are flowcharts representing one embodiment of this invention.
Figure 31B:
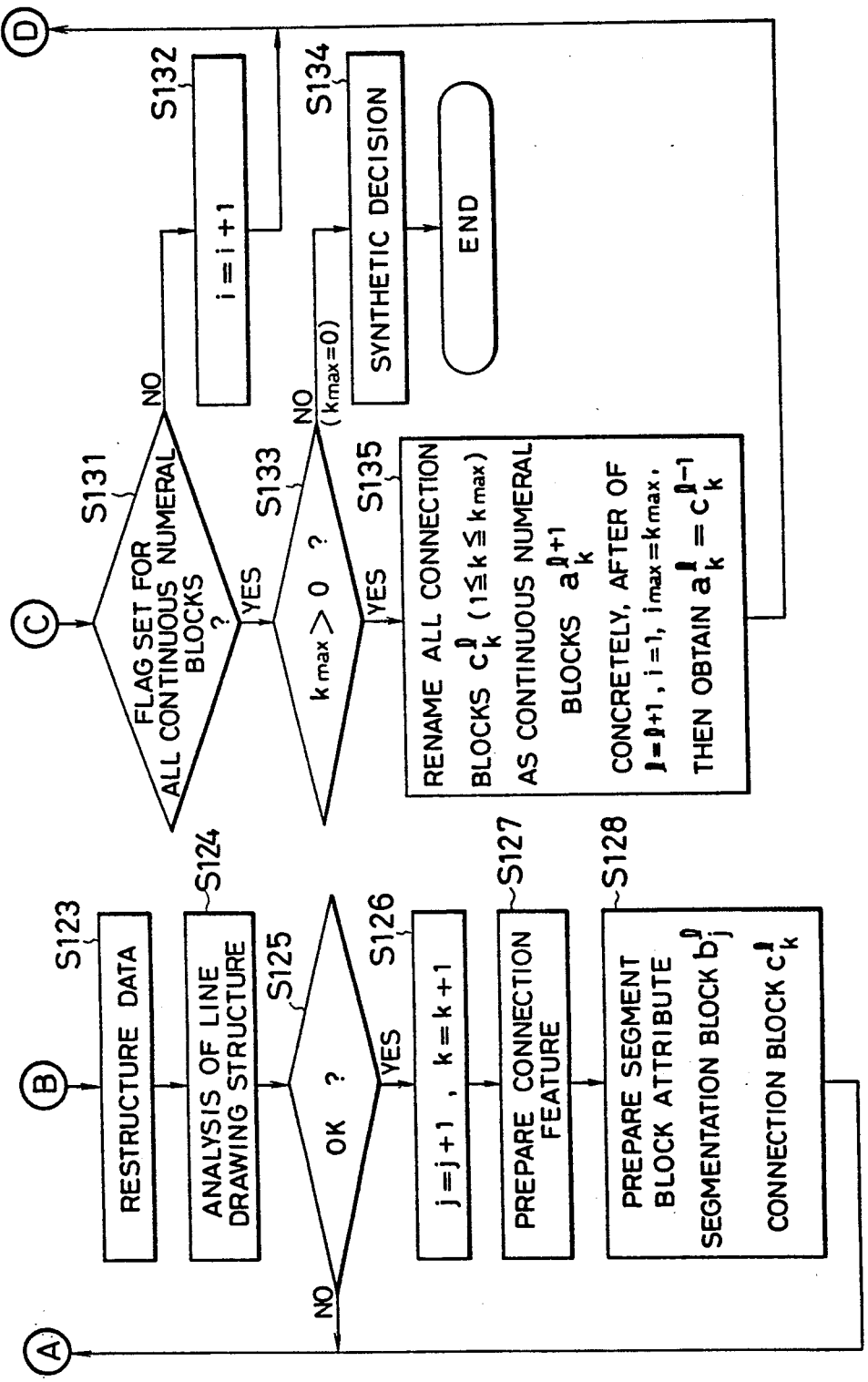

Concrete continuous numerals shown in FIG. 30 will be described next with reference to the detailed flowchart of FIGS. 31A and 31B.

With $l=1$, $i=1$ and $i_{max}=1$, l, i and $i_{max}$ are first initialized (Step S110), a data of continuous numeral block $a_1^l (=a_1^1)$ is structured (Step S111), a line drawing structure is then analyzed (Step S112), and branches ① to ⑧ are selected. Then $1 \geq 2$ will be judged (Step S113), however, since $1 \geq 2$ does not hold, segment information such as center of gravity information of branches or the like is prepared (Step S115), and the order of center of gravity of the branches comes in ①, ②, ③, ④, ⑤, ⑦, ⑥ and ⑧. With i and k zeroized both (Step S116), the continuous numeral block $a_1{}^l$ ($=a_1{}^1$) is segmented (Step S117). The branches are taken off by one (A) as illustrated in FIG. 32 in the order of center of gravity according to the technique disclosed in Japanese Patent Laid-open No. 121988/1989. Whether or not the segmentation is "OK" is ensured (Step S120), and since one piece is taken off now, it is "OK'd", and a balance check is performed (Step S121). Quite different from that of being done finally in a synthetic decision of the Step S134 which will be described hereinlater, the balance check is performed at the time of segmentation, and is so distinguished with "0" put thereto. Concretely, it is decided to be "NG" if the condition "height of candidate branch $<0.5 \times$ height of block" is satisfied. That is, when segmented, if the block is smaller than one half of the original block height, then it is decided to be "NG" (Step S122). If the balance check (0) is "OK", then the data is restructured (Step S123), the line drawing structure is analyzed (Step S124), whether or not the numeral recognition is "OK" is decided (Step S125), however, since the recognition is "NG" now, the procedure returns to the Step S117, the branch ⑥ is taken off one this time, and a block (B) of FIG. 32 is stored, however, since it cannot be recognized as a numeral, the procedure returns to the Step S117, thus the procedure being repeated successively.

Figures 33, 34A, 34B, 34C, 34D, 34E:
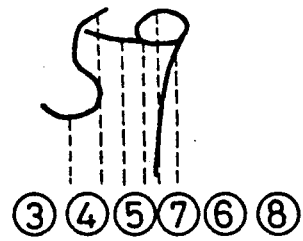

In the state (F) of FIG. 32, the numeral recognition is "OK'd", $j=j+1$, $k=k+1$ in the Step S126, j and k are increased, and then a connection feature is prepared (Step S127). This is to prepare information on how the numeral "1" recognized right now is connected relatively with the branches just prior thereto which were segmented and taken off, and while described in detail hereinlater, the case of "1" is not related thereto. Next, the recognized "1" is segmented to a block $b_j{}^l$ ($=b_1{}^1$), the remaining whole portion after removing the aforementioned $b_1{}^1$ from the continuous numeral block $a_1{}^1$ is made to be a connection block $c_k{}^l$ ($=c_1{}^1$), and a segment block attribute is prepared (Step S128). The block is merely named in the Step S128. The procedure returns to the Step S117 thereafter, and "1" is further segmented as shown in (G) of FIG. 32, however, it cannot be segmented in this case, and hence a flag indicating end of segmentation is placed on the continuous numeral block $a_1{}^l$ ($=a_1{}^1$) (Step S130). Then, whether or not the flag indicating end of segmentation has been placed on all the continuous numeral blocks is viewed (Step S131), however, since the continuous numeral block numbers one as $a_1$ now, whether or not the maximum value of k exceeds 0 is decided next (Step S133), however, since $k=1$ now (increased one time only in Step S126), the connection block $c_1{}^1$ named in the Step S128 is renamed a continuous numeral block $a_1{}^2$ (Step S135), and the procedure returns to the Step S111 to go on with a process similar to what has been described above. That is, $l=2$, $i=1$, $i_{max}=k_{max}=1$ in Step S135, and then the continuous numeral block $a_1{}^2$ shown in FIG. 33 is subjected to a processing, however, since $l=2$, a numeral recognition is carried out once in the Step S114, and the result is written. In this case, whether recognized or not, the result is written as that of recognition of a block $c_k{}^{l-1}$ ($=c_1{}^1$). It has not yet been recognized now.

Next, the branch is taken off one as shown in FIG. 34A, however, a recognition is not realized in the Step S125, and the numeral recognition is ready upon standing like FIG. 34B as the segment, the portion of FIG. 35B is made to be $b_1{}^2$ and the remaining portion of FIG. 35C is made to be $c_1{}^2$ in the Step S128. The procedure returns to the Step S117 and the segmentation is continued also thereafter, and since that of FIG. 34C can be recognized as "5", "5" is made to be $b_2{}^2$, and "9" is made to be $c_2{}^2$. Further the segmentation is continued, and if the upper branch is taken off one from that of FIG. 34D, then the balance check is "OK'd" but the numeral recognition is "NG", further that of FIG. 34E cannot be segmented, therefore a flag indicating end of segmentation of the block $a_1{}^2$ is placed in the Step S130. Since the continuous numeral block numbers one only as $a_1{}^2$ now, the procedure goes forward to the Step S133 from the Step S131, however, a maximum value of k is 2 (k being 2 as passing the Step S126 two times), therefore the procedure goes forward to the Step S135 and returns to the Step S111 after remaining $c_1{}^2$ as $a_1{}^3$ as $a_2{}^3$. In this case, $l=3$, $i=1$, $i_{max}=k_{max}=2$.

Now, a block $a_1{}^3$ shown in FIG. 36A and a block $a_2{}^3$ shown in FIG. 36B will be recognized, and for the block $a_1{}^3$ first, since it can be recognized as "7" in the Step S114, "7" is written as a segment block of $c_1{}^2$. Then, k is reset as $k=0$ in the Step S116, and the upper portion is subjected to a balance check after separation as shown in FIG. 36C in the Step S117, however, it becomes "NG" to return to the Step S117, and the lower portion cannot be segmented, therefore the procedure goes forward to the Step S130 from the Step S120, and the end flag is placed on the block $a_1{}^3$. The block $a_2{}^3$ has not yet come to end, and hence i is increased one as $i=i+1$ in the Step S132 and then the procedure returns to the Step S111. Then, as for the block $a_2{}^3$, it can be recognized as "9" in the Step S114, therefore "9" is written with the result as an attribute of $c_2{}^2$. From continuing the segmentation thereafter as shown in FIG. 36D, the balance check becomes "NG", and thus the procedure returns to the Step S117, but since a further segmentation is not performable, the procedure goes forward to the Step S130 from the Step S120, and an end flag of the block $a_2{}^3$ is placed. In this case, the continuous numeral blocks $a_1{}^3$ and $a_2{}^3$ are all over, therefore the procedure goes forward to the Step S133, and whether or not a maximum value of k is greater than 0 is decided, however, $k=0$ now. Because, k is once reset in the Step S116 before segmentation of the Step S120, and further the numeral recognition is not "OK'd" in the Step S125, therefore k is not increased from 0 without passing the Step S126, and hence $k_{max}=0$. Consequently, a process of synthetic decision is carried out (Step S134).

Other than a decision of applicability of a reject rule according to connection information, the synthetic decision comprises deciding synthetically an applicability of a conventional balance check and a rule to annual the balance check, whether or not different recognized results are obtained in two or more and so forth, thereby securing either reject or one recognized result.

Figure 37:
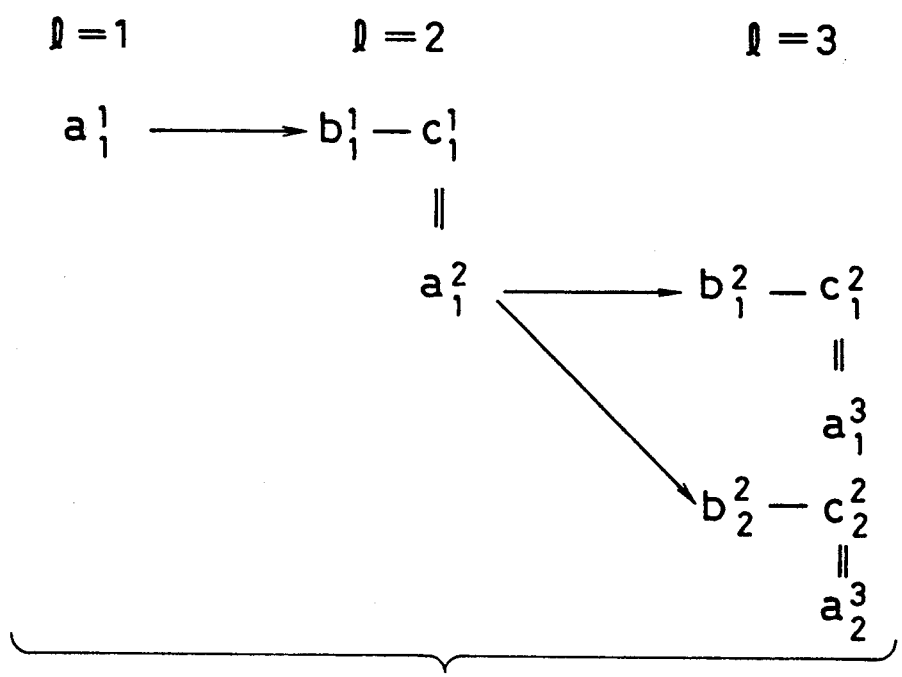
FIG. 37 is a chart showing a segment relationship.

Here, a segment relation and a relation among segment candidates, numeral recognized result and branch string will be described with reference to FIG. 37 and FIG. 38. As shown in FIG. 37, the continuous numeral block $a_1{}^1$ is separated into a segmentation block $b_1{}^1$ and a connection block $c_1^1$, and the connection block $c_1^1$ is replaced by the continuous numeral block $a_1^2$ to segmentation, then it can be separated into a set of segmentation block $b_1^2$, connection block $c_1^2$, and a set of segmentation block $b_2^2$, connection block $c_2^2$ as illustrated therein. Similarly, the connection block $c_1^2$ is replaced by $a_1$ and the connection block $c_2^2$ is replaced by a $a_2^3$ to segmentation. Here, both are not segmented, and a segmentation of the continuous numeral block $a_1^1$ ends, and a set membership of segmentations is shown in FIG. 37, which is available for obtaining segment candidates of FIG. 38. FIG. 38 shows a state where four segments are obtained from the continuous numeral block $a_1^1$, wherein the numeral recognized result comes in "NO", "1"- "NO", "1"- "5"- "7", and "1"- "5"- "9". Then, FIG. 35 is a drawing for illustrating a reject rule according to connection information, wherein a candidate 1 ("25", "7") shown in FIGS. 35 (B), (C) and a candidate 2 ("5", "9") are obtained presumudly against the continuous numerals (A) shown in FIG. 35. Then, with a mid-point of the linear structure length as l and a length from 1 to $a_1$ and $a_2$ as $l_1$, a numeric value of $l_1/l \times 100$ (%) is obtained, and rejected when the following requirements are all satisfied.

$$\begin{cases} a_1: & \text{some degree present on a sweep portion on the right side of numeral 5 coming in 60 to 80\%} \\ a_2: & \text{some degree present on the left end point of numeral 7 coming in 100\%} \\ b_1: & \text{some degree present on a sweep end point on the right side of numeral 5 coming in 100\%} \\ b_2: & \text{some degree present on an upper portion of numeral 7 coming in 0 to 100\%} \end{cases}$$

Here, "157" will be rejected by having the aforementioned reject rule according to connection information applied thereto. That is, when the continuous numeral (A) of FIG. 35 is segmented into those (B) and (C) of FIG. 35, connection information of the connections $a_1$, $b_1$, $a_2$, $b_2$ meets the aforementioned reject rule completely, therefore it is rejected.

Figure 39:
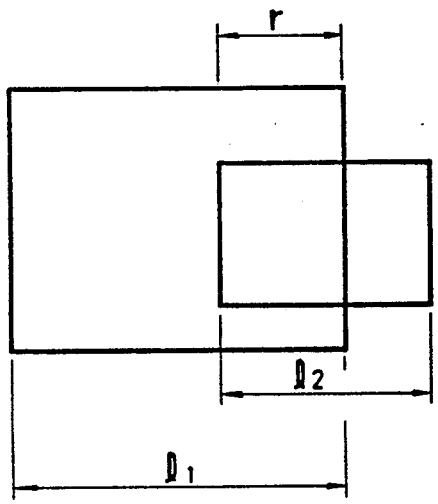
Figure 40:

Referring to a balance check in the synthetic decision, when $$r > 0.7 \times \min(l_1, l_2) \qquad (18)$$

holds with lengths of the two blocks shown in FIG. 39 as $l_1, l_2$, and an overlap as r, the continuous numerals are annulled. Then, the balance check will be annulled between specific numerals an in a specific connected state. For example, that of FIG. 40 is "NG" in ordinary balance check, and this portion annuls the balance check NG, however, "5–0" are effective.

As described above, "159" will be obtained in synthetic decision as a recognized result.

As described in detail above, according to the recognizing method of this invention, a block is segmented at a predetermined distance from one end side of contact numerals, branches are erased from the other end side within the block in the order of center of gravity, a numeral in the block is recognized, and where recognizable, a recognized result and the branches, the remaining branches are stored, further the branches are erased in the order of center of gravity, and such process is repeated to obtain a recognizable separation pattern more than one, next a similar process is repeated to the remaining blocks of the separation pattern, therefore the continuous numerals can be recognized accurately.

It should be understood that many modifications and adaptations of the invention will become apparent to those skilled in the art and it is intended to encompass such obvious modifications and changes in the scope of the claims appended hereto.

What is claimed is:

1. A character recognizing apparatus which recognizes handwritten characters from information relating to a character set to be sensed by making use of a knowledge base containing required rules for recognition and a reasoning mechanism for performing a reasoning based on the knowledge base, comprising: a block feature extracting means for extracting a sole character block from a character set to be recognized and for extracting features of the block including a certainty factor including a handwritten bar for each block; a block arrangement type extracting means for extracting, from among a plurality of predetermined block arrangement types, arrangement types similar to the arrangement of the character block as block arrangement type candidates by using the features of the block extracted by said block feature extracting means; a block attribute assignment means for assigning block attribute candidates for each character block based on the block arrangement type extracted by said block arrangement type extracting means; a verification means for verifying the candidates on the basis of the block arrangement type candidates and the block attribute candidates; and a handwritten bar separating means for extracting the character by separating the bar from the block including the handwritten bar according to the block attribute.

2. A character recognizing apparatus as claimed in claim 1, wherein said verification means carries out a first hypothesis verification to assign and renew the attribute on the basis of character type and a second hypothesis verification to verify based on segmenting process and overall arrangement.

3. A character recognizing apparatus as claimed in claim 1, further including a segment recognizing means for separating the characters one by one from a continuous character block in which characters contact each other according to the block attribute and for recognizing the character.

4. A character recognizing apparatus as claimed in claim 1, wherein said block feature extracting means classifies the block into plural areas, obtains presence numbers of constituent components which comprise the character and calculates the certainty factor of including a handwritten bar for each block in accordance with the presence numbers.

5. A character recognizing apparatus as claimed in claim 4, wherein said constituent components are vertical, horizontal and inclined components.

6. A character recognizing apparatus as claimed in claim 1, wherein the handwritten characters are numerals.

7. A character recognizing apparatus as claimed in claim 1, wherein said handwritten bar separating means detects end points from said character information, detects a linear distance between two end points, obtains a number of dots connecting said end points, detects said handwritten bar based on a ratio of a linear distance as against an effective path length between any two end points, and separates the thus detected handwritten bar in order to extract said handwritten characters.

8. A character recognizing apparatus as claimed in claim 7, wherein said handwritten bar separating means hypothesizes a cent-bar among the paths, judges whether or not a branch is commonly shared with a numeral, eliminates the hypothesized bar if the branch does not exist, and eliminates the hypothesized cent-bar except for the shared branch from the block if the branch exists and segments a numeral portion.

9. A character extraction method for detecting a handwritten bar contained in a character information to recognize handwritten characters in the character information which comprises the steps of: extracting a block comprising a group of continuous characters out of said character information; dividing thus extracted block into plural areas $Z(i, j)$ $(i=0\sim m, j=0\sim n)$; counting a number of vertical masks which are vertical components forming the handwritten characters; counting a number of incline masks which are incline components and counting a number of horizontal masks which are horizontal components for each areas $Z(i, j)$; obtaining a certainly factor of the block of containing the handwritten bar for each block based on the number of masks existing in each are $(Z(i, j)$; detecting end points in the block having the higher certainty factor including the handwritten bar; obtaining a linear distance between the thus detected end points and the effective path length or the number of dots between the end points, and detecting the handwritten bar based on the ratio of the linear distance against the effective path length between the end points to extract said handwritten characters.

10. A method of identifying numerals of a candidate block, the candidate block containing a plurality of connected numerals and extending in width from a first end to a second end, said method comprising the steps of:
 (a) identifying and prioritizing branches of the plurality of connected numerals, wherein branches closest to the first end of the candidate block are given a relatively higher priority than branches closest to the second end of the candidate block;
 (b) dividing the candidate block into a recognition block extending a predetermined distance from the first end of the candidate block;
 (c) judging whether or not there are recognizable numerals in the recognition block;
 (d) storing the recognizable numerals when it has been determined that there are recognizable numerals in the recognition block in step (c);
 (e) erasing one branch having a lowest priority in the recognition block regardless of the presence of recognizable numerals determined in (c);
 (f) repeating steps (c), (d) and (e) until the branch within the recognition block becomes nil;
 (g) removing the recognizable numerals from the candidate and dividing it into a next recognition block when the recognizable numerals are stored;
 (h) repeating steps (c) to (g) for all of the recognizable numerals stored in step (d); and
 (i) selecting a most suitable numeral therefrom when plural numerals are obtained as a recognition result.

* * * * *